United States Patent
Deshpande

(10) Patent No.: US 12,323,628 B2
(45) Date of Patent: Jun. 3, 2025

(54) SYSTEMS AND METHODS FOR SIGNALING REFERENCE PICTURES IN VIDEO CODING

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/378,723

(22) Filed: Oct. 11, 2023

(65) Prior Publication Data

US 2024/0056608 A1    Feb. 15, 2024

Related U.S. Application Data

(63) Continuation of application No. 17/880,367, filed on Aug. 3, 2022, now Pat. No. 11,877,012, which is a (Continued)

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/172* (2014.11); *H04N 19/174* (2014.11)

(58) Field of Classification Search
None
See application file for complete search history.

(56) References Cited

U.S. PATENT DOCUMENTS

| 10,230,972 B2 * | 3/2019 | Deshpande ........... H04N 19/105 |
| 2013/0077687 A1 * | 3/2013 | Wang .................... H04N 19/174 |
| | | 375/E7.243 |

(Continued)

FOREIGN PATENT DOCUMENTS

| WO | WO-2013184305 A1 * | 12/2013 | ........... H04N 19/105 |
| WO | WO-2014006854 A1 * | 1/2014 | ........... H04N 19/105 |
| WO | WO-2014052123 A1 * | 4/2014 | ........... H04N 19/503 |

OTHER PUBLICATIONS

International Telecommunication Union, "ITU-T H.265 Series H: Audiovisual and Multimedia Systems Infrastructure of audiovisual services—Coding of moving video High Efficiency Video Coding" Feb. 2018 (Year: 2018).*

(Continued)

*Primary Examiner* — Stefan Gadomski
(74) *Attorney, Agent, or Firm* — Keating & Bennett, LLP

(57) ABSTRACT

A method for determining a reference index for a reference picture list is disclosed. A reference picture list structure in one of a sequence parameter set and a slice header is decoded. A reference index for the reference picture list structure is derived according to a value of a reference picture list flag. A number of reference index active syntax in the slice header is decoded, if a number of entries in the reference picture list structure is greater than 1. The number of reference index active syntax is defined for i. A variable is derived by adding one to a value of the number of reference index active syntax. A value subtracted one from a value of the variable specifies a maximum reference index for the reference picture list.

3 Claims, 7 Drawing Sheets

Related U.S. Application Data continuation of application No. 17/276,621, filed as application No. PCT/JP2019/036315 on Sep. 17, 2019, now Pat. No. 11,463,736.

(60) Provisional application No. 62/734,995, filed on Sep. 21, 2018, provisional application No. 62/735,093, filed on Sep. 22, 2018, provisional application No. 62/737,049, filed on Sep. 26, 2018, provisional application No. 62/739,263, filed on Sep. 30, 2018.

(51) Int. Cl.
*H04N 19/172* (2014.01)
*H04N 19/174* (2014.01)

(56) References Cited

U.S. PATENT DOCUMENTS

| | | | |
|---|---|---|---|
| 2013/0089134 A1* | 4/2013 | Wang .................. | H04N 19/423 |
| | | | 375/E7.026 |
| 2014/0140406 A1* | 5/2014 | Yu ......................... | H04N 19/70 |
| | | | 375/240.16 |
| 2014/0286416 A1* | 9/2014 | Jeon ..................... | H04N 19/593 |
| | | | 375/240.12 |

OTHER PUBLICATIONS

Deshpande, "Systems and Methods for Deriving a Motion Vector in Video Coding", U.S. Appl. No. 17/880,367, filed Aug. 3, 2022.

* cited by examiner

SYSTEMS AND METHODS FOR SIGNALING REFERENCE PICTURES IN VIDEO CODING

TECHNICAL FIELD

This disclosure relates to video coding and more particularly to techniques for signaling reference pictures for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the $10^{th}$ Meeting of ISO/IEC JTC1/SC29/WG11 16-20 Apr. 2018, San Diego, CA. As a result of the multiple descriptions of video coding, a draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v5, which is incorporated by reference herein, and referred to as JVETK1001, is an update to JVET-J1001.

Video compression techniques reduce data requirements for storing and transmitting video data by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method for determining a reference index for a reference picture list, the method comprising: decoding a reference picture list structure in one of a sequence parameter set and a slice header; deriving a reference index for the reference picture list structure according to a value of a reference picture list flag; decoding a number of reference index active syntax in the slice header, if a number of entries in the reference picture list structure is greater than 1, wherein the number of reference index active syntax is defined for i; and deriving a variable by adding one to a value of the number of reference index active syntax, wherein a value subtracted one from a value of the variable specifies a maximum reference index for the reference picture list.

DESCRIPTION OF EMBODIMENTS

Figure 1:
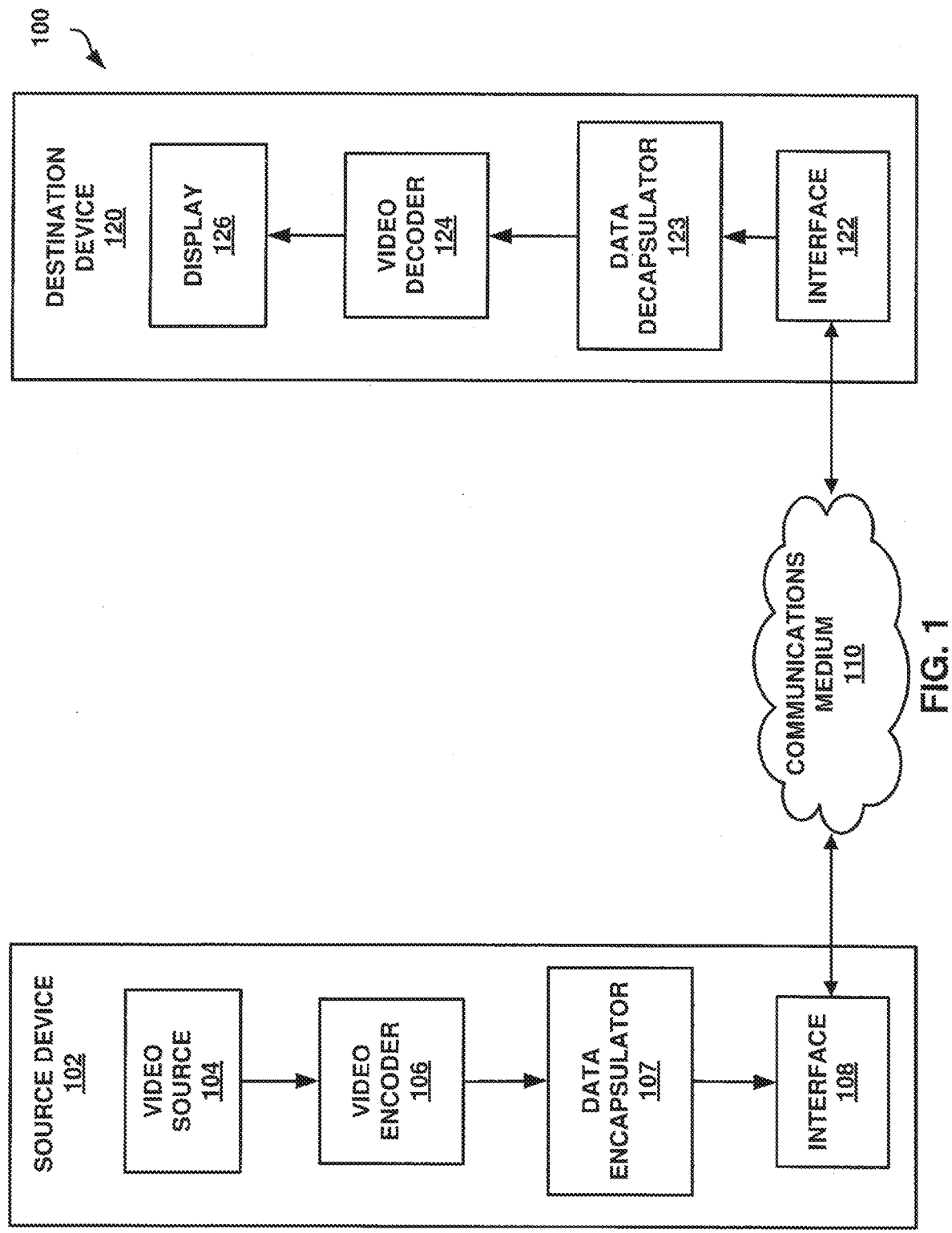
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling reference pictures for coded video. Signaling of reference pictures according to the techniques described herein may be particularly useful for improving video distribution system performance by lowering transmission bandwidth. It should be noted that although techniques of this disclosure are described with respect to ITU-T H.264, ITU-T H.265, JVET-J1001, and JVET-K1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, and JVET-K1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling reference picture list comprises signaling one or more candidate reference picture lists in a parameter set, an signaling an index to one of the candidate reference picture lists in a header associated with a region of a picture.

In one example, a device comprises one or more processors configured to signal one or more candidate reference picture lists in a parameter set, and signal an index to one of the candidate reference picture lists in a header associated with a region of a picture.

In one example, a non-transitory computer-readable storage medium comprises instructions stored thereon that, when executed, cause one or more processors of a device to signal one or more candidate reference picture lists in a parameter set, and signal an index to one of the candidate reference picture lists in a header associated with a region of a picture.

In one example, an apparatus comprises means for signaling one or more candidate reference picture lists in a parameter set, and means for signaling an index to one of the candidate reference picture lists in a header associated with a region of a picture.

In one example, a method of decoding video data comprises parsing one or more syntax elements included in a parameter set, the syntax elements indicating one or more candidate reference picture lists, parsing an index from a header associated with a region of a picture, the index indicating one of the candidate reference picture lists, and generating video data based on the indicated candidate reference picture list.

In one example, a device comprises one or more processors configured to parse one or more syntax elements included in a parameter set, the syntax elements indicating one or more candidate reference picture lists, parse an index from a header associated with a region of a picture, the index indicating one of the candidate reference picture lists, and generate video data based on the indicated candidate reference picture list.

In one example, a non-transitory computer-readable storage medium comprises instructions stored thereon that, when executed, cause one or more processors of a device to parse one or more syntax elements included in a parameter set, the syntax elements indicating one or more candidate reference picture lists, parse an index from a header associated with a region of a picture, the index indicating one of the candidate reference picture lists, and generate video data based on the indicated candidate reference picture list.

In one example, an apparatus comprises means for parsing one or more syntax elements included in a parameter set, the syntax elements indicating one or more candidate reference picture lists, means for parsing an index from a header associated with a region of a picture, the index indicating one of the candidate reference picture lists, and means for generating video data based on the indicated candidate reference picture list.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block includes an array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure (which may be referred to as a Largest Coding Unit (LCU)) where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to ITU-T H.265, each video frame or picture may be partitioned to include one or more tiles, where a tile is a sequence of coding tree units corresponding to a rectangular area of a picture.

In ITU-T H.265, a CTU is composed of respective CTBs for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
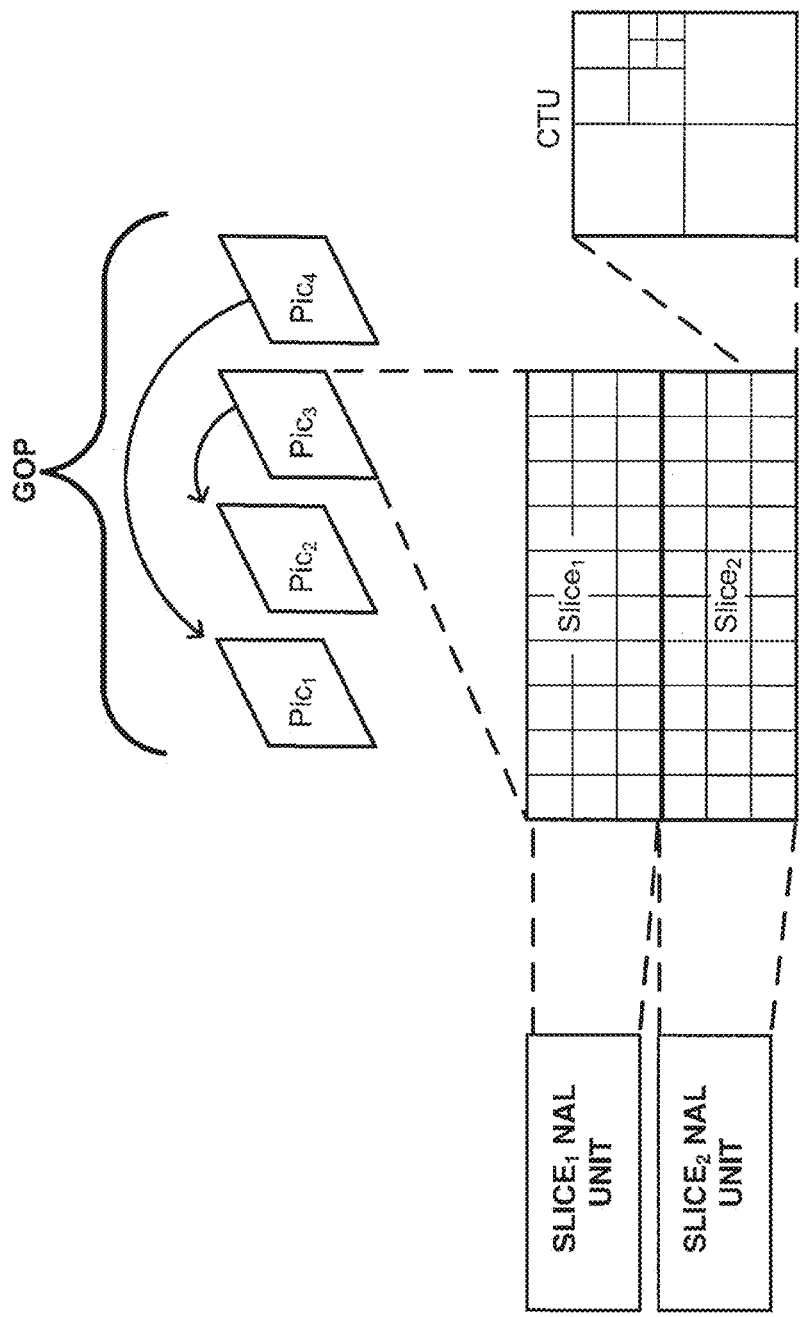
FIG. 2 is a conceptual diagram illustrating coded video data and corresponding data structures according to one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. Thus, the binary tree structure in JEM enables square and rectangular leaf nodes, where each leaf node includes a CB. As illustrated in FIG. 2, a picture included in a GOP may include slices, where each slice includes a sequence of CTUs and each CTU may be partitioned according to a QTBT structure. In JEM, CBs are used for prediction without any further partitioning. That is, in JEM, a CB may be a block of sample values on which the same prediction is applied. Thus, a JEM QTBT leaf node may be analogous a PB in ITU-T H.265.

Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a previously coded picture (i.e., picture available when decoding or encoding a current picture) for coding a current video block in a current picture and thereby exploits temporal redundancy in video. For example, a current video block may be predicted from reference block(s) located in previously coded picture(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP), Pattern matched motion vector derivation (PMMVD) mode, which is a special merge mode based on Frame-Rate Up Conversion (FRUC) techniques, and affine transform motion compensation prediction.

Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. In ITU-T H.265, a CU is associated with a transform unit (TU) structure having its root at the CU level. That is, in ITU-T H.265, as described above, an array of difference values may be subdivided for purposes of generating transform coefficients (e.g., four 8×8 transforms may be applied to a 16×16 array of residual values). It should be noted that in ITU-T H.265, TBs are not necessarily aligned with PBs.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization approximates transform coefficients by amplitudes restricted to a set of specified values. Quantization may be used in order to vary the amount of data required to represent a group of transform coefficients. Quantization may be realized through division of transform coefficients by a scaling factor and any associated rounding functions (e.g., rounding to the nearest integer). Quantized transform coefficients may be referred to as coefficient level values. Inverse quantization (or "dequantization") may include multiplication of coefficient level values by the scaling factor. It should be noted that as used herein the term quantization process in some instances may refer to division by a scaling factor to generate level values or multiplication by a scaling factor to recover transform coefficients in some instances. That is, a quantization process may refer to quantization in some cases and inverse quantization in some cases.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

Further, the following mathematical functions may be used:
Log 2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

With respect to the example syntax used herein, the following definitions of logical operators may be applied:
x && y Boolean logical "and" of x and y
x||y Boolean logical "or" of x and y
!Boolean logical "not"
x?y:z If x is TRUE or not equal to 0, evaluates to the value of y; otherwise, evaluates to the value of z.

Further, the following relational operators may be applied:
> Greater than
>= Greater than or equal to
< Less than
<= Less than or equal to
== Equal to
!= Not equal to Further, it should be noted that in the syntax descriptors used herein, the following descriptors may be applied:
b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
u(n): unsigned integer using n bits.
ue(v): unsigned integer 0-th order Exp-Golomb-coded syntax element with the left bit first.

As described above, according to ITU-T H.265, each video frame or picture may be partitioned to include one or more slices and further partitioned to include one or more tiles. FIG. 2 is a conceptual diagram illustrating an example of a group of pictures including slices. In the example illustrated in FIG. 2, $Pic_3$ is illustrated as including two slices (i.e., $Slice_1$ and $Slice_2$) where each slice includes a sequence of CTUs (e.g., in raster scan order). It should be noted that a slice is a sequence of one or more slice segments starting with an independent slice segment and containing all subsequent dependent slice segments (if any) that precede the next independent slice segment (if any) within the same access unit. A slice segment, like a slice, is a sequence of coding tree units. In the examples described herein, in some cases the terms slice and slice segment may be used interchangeably to indicate a sequence of coding tree units. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Tile sets may be used to define boundaries for coding dependencies (e.g., intra-prediction dependencies, entropy encoding dependencies, etc.) and as such, may enable parallelism in coding.

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. It should be noted that ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier indicating a layer of video data the NAL unit is associated with. It should be noted that sub-bitstream extraction may refer to a process where a device receiving a compliant bitstream forms a new compliant bitstream by discarding and/or modifying data in the received bitstream. For example, sub-bitstream extraction may be used to form a new compliant bitstream corresponding to a particular representation of video (e.g., a high quality representation).

Referring to the example illustrated in FIG. 2, each slice of video data included in $Pic_3$ (i.e., $Slice_1$ and $Slice_2$) is illustrated as being encapsulated in a NAL unit. In ITU-T H.265, each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (i.e., signaled out-of-band).

Figure 3:
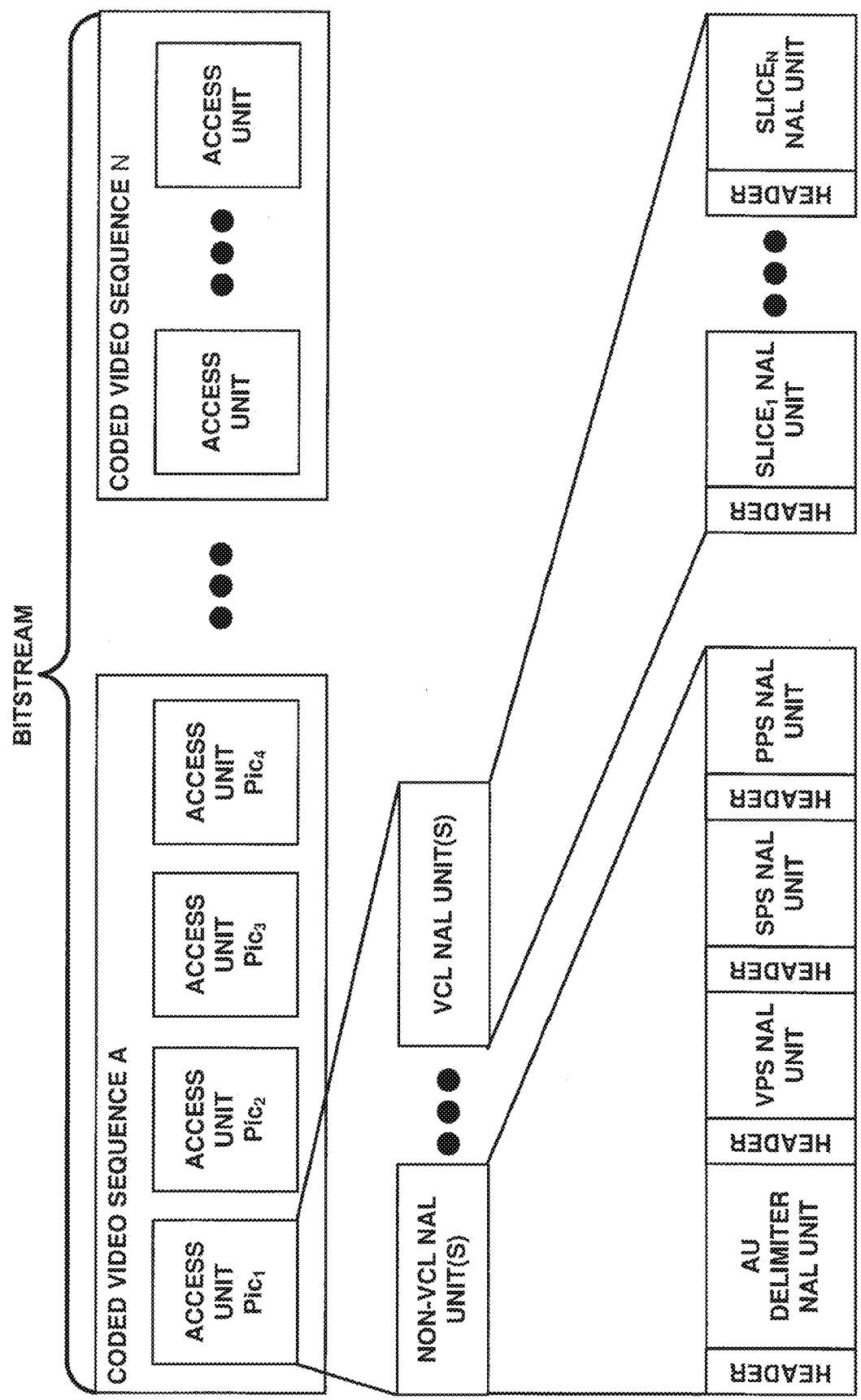
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS is represented by NAL units included in a respective access unit. In the example illustrated in FIG. 3, non-VCL NAL units include respective parameter set units (i.e., Video Parameter Sets (VPS), Sequence Parameter Sets (SPS), and Picture Parameter Set (PPS) units) and an access unit delimiter NAL unit. ITU-T H.265 defines NAL unit header semantics that specify the type of Raw Byte Sequence Payload (RBSP) data structure included in the NAL unit.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_{-1}$. The process of marking pictures for removal from a DPB may be referred to as reference picture set (RPS) management.

In ITU-T H.265, the RPS of the current picture consists of five RPS lists: RefPicSetStCurrBefore, RefPicSetStCurrAfter, RefPicSetStFoll, RefPicSetLtCurr and RefPicSetLtFoll. RefPicSetStCurrBefore, RefPicSetStCurrAfter and RefPicSetStFoll are collectively referred to as the short-term RPS. RefPicSetLtCurr and RefPicSetLtFoll are collectively referred to as the long-term RPS. It should be noted that in ITU-T H.265 and RefPicSetStCurrBefore, RefPicSetStCurrAfter and RefPicSetLtCurr contain all reference pictures that may be used for inter prediction of the current picture and one or more pictures that follow the current picture in decoding order. RefPicSetStFoll and RefPicSetLtFoll consist of all reference pictures that are not used for inter prediction of the current picture but may be used in inter prediction for one or more pictures that follow the current picture in decoding order. ITU-T H.265 provides where each coded picture is associated with a picture order count variable, denoted as PicOrderCntVal. In ITU-T H.265, picture order counts are used to identify pictures. In ITU-T H.265, in one CVS, the PicOrderCntVal values for each of the coded pictures is unique. Further, in ITU-T H.265 picture order counts provide the relative output order of pictures (i.e., from a decoded picture buffer, e.g., for display) included in a CVS (i.e., pictures with lower picture order counts are output before pictures with a higher picture order counts). In ITU-T H.265, the value of PicOrderCntVal is in the range of $-2^{31}$ to $2^{31-1}$, inclusive. ITU-T H.265 provides where syntax explicitly identifies which pictures are to be included in the RPS, as opposed to indicating which pictures are to be included in the RPS implicitly by identifying which pictures are to be removed from the DPB.

As described above, ITU-T H.265 provides two general types of reference pictures sets: long-term reference picture sets and short-term reference picture sets. Thus, ITU-T H.265 provides where pictures in the DPB are marked as follows: "unused for reference," "used for short-term reference," or "used for long-term reference." In ITU-T H.265, short-term reference pictures are identified by their PicOrderCntVal values and long-term reference pictures are identified either by their PicOrderCntVal values or their slice_pic_order_cnt_lsb values (described below). ITU-T H.265 further provides where the following five lists of picture order count values are constructed to derive the RPS: PocStCurrBefore, PocStCurrAfter, PocStFoll, PocLtCurr and PocLtFoll. The construction of PocStCurrBefore, PocStCurrAfter, PocStFoll, PocLtCurr and PocLtFoll is described in further detail below.

In ITU-T H.265, a set of long-term RPS may be signaled in an SPS. Further, in ITU-T sets of candidate short-term RPSs may be in signaled in the SPS. Further, one of the candidate short-term RPSs may be indicated by signaling of an index to one of the SPS candidate RPSs in the slice segment header. Further, short-term RPS may be signaled directly in slice segment header.

Table 1 illustrates the portion of the sequence parameter set in ITU-T H.265 relating to indicating reference picture sets.

TABLE 1

| | Descriptor |
|---|---|
| seq_parameter_set( ) { | |
| ... | |
| num_short_term_ref_pic_sets | ue(v) |
| for( i = 0; i < num_short_term_ref_pic_sets; i++) | |
| st_ref_pic_set( i ) | |

TABLE 1-continued

| | Descriptor |
|---|---|
| long_term_ref_pic_present_flag | u(1) |
| if( long_term_ref_pics_present_flag ) { | |
|   num_long_term_ref_pic_sps | ue(v) |
|   for( i = 0; i < num_long_term_ref_pic_sets; i++) | |
|     lt_ref_pic_poc_lsb_sps[ i ] | u(v) |
|     used_by_curr_pic_lt_sps_flag[ i ] | u(1) |
|   } | |
| } | |
| ... | |

ITU-T H.265 provides the following definitions for the respective syntax elements illustrated in Table 1.

num_short_term_ref_pic_sets specifies the number of st_ref_pic_set( ) syntax structures included in the SPS. The value of num_short_term_ref_pic_sets shall be in the range of 0 to 64, inclusive.

long_term_ref_pics_present_flag equal to 0 specifies that no long-term reference picture is used for inter prediction of any coded picture in the CVS.

long_term_ref_pics_present_flag equal to 1 specifies that long-term reference pictures may be used for inter prediction of one or more coded pictures in the CVS.

num_long_term refpics_sps specifies the number of candidate long-term reference pictures that are specified in the SPS. The value of num_long_term_ref_pics_sps shall be in the range of 0 to 32, inclusive.

lt_ref_pic_poc_lsb_sps[i] specifies the picture order count modulo MaxPicOrderCntLsb of the i-th candidate long-term reference picture specified in the SPS. The number of bits used to represent lt_ref_pic_poc_lsb_sps[i] is equal to log 2_max_pic_order_cnt_lsb_minus4+4.

used_by_curr_pic_lt_sps_flag[i] equal to 0 specifies that the i-th candidate long-term reference picture specified in the SPS is not used for reference by a picture that includes in its long-term reference picture set (RPS) the i-th candidate long-term reference picture specified in the SPS.

With respect to st_ref_pic_set (i), Table 2 illustrates the st_ref_pic_set(i) syntax provided in ITU-T H.265.

TABLE 2

| | Descriptor |
|---|---|
| st_ref_pic_set( stRpsIdx ) { | |
|   if( stRpsIdx != 0 ) | |
|     inter_ref_pic_set_prediction_flag | u(1) |
|   if( inter_ref_pic_set_prediction_flag ) { | |
|     if( stRpsIdx == num_short_term_ref_pic_sets ) | |
|       delta_idx_minus1 | ue(v) |
|     delta_rps_sign | u(1) |
|     abs_delta_rps_minus1 | ue(v) |
|     for( j = 0; j <= NumDeltaPocs[ RefRpsIdx ]; j++ ) { | |
|       used_by_curr_pic_flag[ j ] | u(1) |
|       if( !used_by_curr_pic_flag[ j ] ) | |
|         use_delta_flag[ j ] | u(1) |
|     } | |
|   } else { | |
|     num_negative_pics | ue(v) |
|     num_positive_pics | ue(v) |
|     for( i = 0; i < num_negative_pics; i++ ) { | |
|       delta_poc_s0_minus1[ i ] | ue(v) |
|       used_by_curr_pic_s0_flag[ i ] | u(1) |
|     } | |
|     for( i = 0; i < num_positive_pics; i++ ) { | |
|       delta_poc_s1_minus1[ i ] | ue(v) |
|       used_by_curr_pic_s1_flag[ i ] | u(1) |
|     } | |
|   } | |
| } | |

ITU-T H.265 provides the following definitions for the respective syntax elements illustrated in Table 2.

inter_ref_pic_set_prediction_flag equal to 1 specifies that the stRpsIdx-th candidate short-term RPS is predicted from another candidate short-term RPS, which is referred to as the source candidate short-term RPS. When inter_ref_pic_set_prediction_flag is not present, it is inferred to be equal to 0.

delta_idx_minus1 plus 1 specifies the difference between the value of stRpsIdx and the index, into the list of the candidate short-term RPSs specified in the SPS, of the source candidate short-term RPS. The value of delta_idx_minus1 shall be in the range of 0 to stRpsIdx-1, inclusive. When delta_idx_minus1 is not present, it is inferred to be equal to 0.

The variable RefRpsIdx is derived as follows:

RefRpsIdx=stRpsIdx−(delta_idx_minus1+1)

delta_rps_sign and abs_delta_rps_minus1 together specify the value of the variable deltaRps as follows:

deltaRps=(1−2*delta_rps_sign)*(abs_delta_rps_minus1+1)

The variable deltaRps represents the value to be added to the picture order count difference values of the source candidate short-term RPS to obtain the picture order count difference values of the stRpsIdx-th candidate short-term RPS. The value of abs_delta_rps_minus1 shall be in the range of 0 to $2^{15}-1$, inclusive.

used_by_curr_pic_flag[j] equal to 0 specifies that the j-th entry in the source candidate short-term RPS is not used for reference by the current picture.

use_delta_flag[j] equal to 1 specifies that the j-th entry in the source candidate short-term RPS is included in the stRpsIdx-th candidate short-term RPS.

use_delta_flag[j] equal to 0 specifies that the j-th entry in the source candidate short-term RPS is not included in the stRpsIdx-th candidate short-term RPS. When use_delta_flag[j] is not present, its value is inferred to be equal to 1.

When inter_ref_pic_setprediction_flag is equal to 1, the variables DeltaPocS0[stRpsIdx][i], UsedByCurrPicS0[stRpsIdx][i], NumNegativePics[stRpsIdx], DeltaPocS1[stRpsIdx][i], UsedByCurrPicS1[stRpsIdx][i] and NumPositivePics[stRpsIdx] are derived as follows:

```
i = 0
for( j = NumPositivePics[ RefRpsIdx ] − 1; j >= 0; j− − ) {
  dPoc = DeltaPocS1[ RefRpsIdx ][ j ] + deltaRps
  if( dPoc < 0 && use_delta_flag[ NumNegativePics[ RefRpsIdx ] +
j ] ) {
    DeltaPocS0[ stRpsIdx ][ i ] = dPoc
    UsedByCurrPicS0[  stRpsIdx  ][  i++  ]  =
used_by_curr_pic_flag[ NumNegativePics[ RefRpsIdx ] + j ]
  }
}
if( deltaRps < 0 && use_delta_flag[ NumDeltaPocs[ RefRpsIdx ]
] ) {
  DeltaPocS0[ stRpsIdx ][ i ] = deltaRps
  UsedByCurrPicS0[  stRpsIdx  ][  i++  ]  =
used_by_curr_pic_flag[ NumDeltaPocs[ RefRpsIdx ] ]
}
for( j = 0; j < NumNegativePics[ RefRpsIdx ]; j++ ) {
  dPoc = DeltaPocS0[ RefRpsIdx ][ j ] + deltaRps
  if( dPoc < 0 && use_delta_flag[ j ] ) {
    DeltaPocS0[ stRpsIdx ][ i ] = dPoc
    UsedByCurrPicS0[ stRpsIdx ][ i++ ] = used_by_curr_pic_flag[ j ]
  }
}
```

```
NumNegativePics[ stRpsIdx ] = i
i = 0
for( j = NumNegativePics[ RefRpsIdx ] − 1; j  >=  0; j− − ) {
    dPoc = DeltaPocS0[ RefRpsIdx ][ j ] + deltaRps
    if( dPoc > 0  &&  use_delta_flag[ j ] ) {
        DeltaPocS1[ stRpsIdx ][ i ] = dPoc
        UsedByCurrPicS1[ stRpsIdx ][ i++ ] = used_by_curr_pic_flag[ j ]
    }
}
if( deltaRps > 0  &&  use_delta_flag[ NumDeltaPocs[ RefRpsIdx ]
] ) {
DeltaPocS1[ stRpsIdx ][ i ] = deltaRps
    UsedByCurrPicS1[    stRpsIdx    ][    i++    ]    =
used_by_curr_pic_flag[ NumDeltaPocs[ RefRpsIdx ] ]
}
for( j = 0; j < NumPositivePics[ RefRpsIdx ]; j++) {
    dPoc = DeltaPocS1[ RefRpsIdx ][ j ] + deltaRps
    if( dPoc > 0  &&  use_delta_flag[ NumNegativePics[ RefRpsIdx ] +
j ] ) {
        DeltaPocS1[ stRpsIdx ][ i ] = dPoc
        UsedByCurrPicS1[    stRpsIdx    ][    i++    ]    =
used_by_curr_pic_flag[ NumNegativePics[ RefRpsIdx ] + j ]
    }
}
NumPositivePics[ stRpsIdx ] = i
``` num_negative_pics specifies the number of entries in the stRpsIdx-th candidate short-term RPS that have picture order count values less than the picture order count value of the current picture. When nuh_layer_id of the current picture is equal to 0, the value of num_negative_pics shall be in the range of 0 to sps_max_dec_pic_buffering_minus1[sps_max_sub_layers_minus1], inclusive.

num_positive_pics specifies the number of entries in the stRpsIdx-th candidate short-term RPS that have picture order count values greater than the picture order count value of the current picture. When nuh_layer_id of the current picture is equal to 0, the value of num_positive_pics shall be in the range of 0 to sps_max_dec_pic_buffering_minus1[sps_max_sub_layers_minus1]−num_negative_pics, inclusive.

delta_poc_s0_minus1[i] plus 1, when i is equal to 0, specifies the difference between the picture order count values of the current picture and i-th entry in the stRpsIdx-th candidate short-term RPS that has picture order count value less than that of the current picture, or, when i is greater than 0, specifies the difference between the picture order count values of the (i−1)-th entry and the i-th entry in the stRpsIdx-th candidate short-term RPS that have picture order count values less than the picture order count value of the current picture. The value of delta_poc_s0_minus1[i] shall be in the range of 0 to $2^{15}$−1, inclusive.

used_by_currpic_s0_flag[i] equal to 0 specifies that the i-th entry in the stRpsIdx-th candidate short-term RPS that has picture order count value less than that of the current picture is not used for reference by the current picture.

delta_poc_s1_minus1[i] plus 1, when i is equal to 0, specifies the difference between the picture order count values of the current picture and the i-th entry in the stRpsIdx-th candidate short-term RPS that has picture order count value greater than that of the current picture, or, when i is greater than 0, specifies the difference between the picture order count values of the i-th entry and the (i−1)-th entry in the current candidate short-term RPS that have picture order count values greater than the picture order count value of the current picture. The value of delta_poc_s1_minus1[i] shall be in the range of 0 to $2^{15}$−1, inclusive.

used_by_curr_pic_s1_flag[i] equal to 0 specifies that the i-th entry in the current candidate short-term RPS that has picture order count value greater than that of the current picture is not used for reference by the current picture.

When inter_ref_pic_set_prediction_flag is equal to 0, the variables NumNegativePics[stRpsIdx], NumPositivePics[stRpsIdx], UsedByCurrPicS0[stRpsIdx][i], UsedByCurrPicS1[stRpsIdx][i], DeltaPocS0[stRpsIdx][i] and DeltaPocS1[stRpsIdx][i] are derived as follows:

NumNegativePics[stRpsIdx]=num_negative_pics

NumPositivePics[stRpsIdx]=num_positive_pics

UsedByCurrPicS0[stRpsIdx][i]=used_by_curr_pic_s0_flag[i]

UsedByCurrPicS1[stRpsIdx][i]=used_by_curr_pic_s1_flag[i]

If i is equal to 0, the following applies:

DeltaPocS0[stRpsIdx][i]=−(delta_poc_s0_minus1[i]+1)

DeltaPocS1[stRpsIdx][i]=delta_poc_s1_minus1[i]+1

Otherwise, the following applies:

DeltaPocS0[stRpsIdx][i]=DeltaPocS0[stRpsIdx][i−1]−(delta_poc_s0_minus1[i]+1)

DeltaPocS1[stRpsIdx][i]=DeltaPocS1[stRpsIdx][i−1]+(delta_poc_s1_minus1[i]+1)

The variable NumDeltaPocs[stRpsIdx] is derived as follows:

NumDeltaPocs[stRpsIdx]=NumNegativePics[stRpsIdx]+NumPositivePics[stRpsIdx]

As described above, ITU-T H.265 specifies where a st_ref_pic_set(stRpsIdx) syntax structure may be present in an SPS or in a slice segment header. ITU-T H.265 further provides where depending on whether the syntax structure is included in a slice header or an SPS, the following applies:

If present in a slice header, the st_ref_pic_set(stRpsIdx) syntax structure specifies the short-term RPS of the current picture (the picture containing the slice), and the following applies:

The content of the st_ref_pic_set(stRpsIdx) syntax structure shall be the same in all slice headers of the current picture.

The value of stRpsIdx shall be equal to the syntax element num_short_term_ref_pic_sets in the active SPS.

The short-term RPS of the current picture is also referred to as the num_short_term_ref_pic_sets-th candidate short-term RPS in the semantics specified in the remainder of this clause.

Otherwise (present in an SPS), the st_ref_pic_set(stRpsIdx) syntax structure specifies a candidate short term RPS, and the term "the current picture" in the semantics specified in the remainder of this clause refers to each picture that has short_term_ref_pic_set_idx_equal to stRpsIdx in a CVS that has the SPS as the active SPS.

Table 3 illustrates the portion of the slice segment header in ITU-T H.265 relating to indicating reference picture sets.

TABLE 3

|  | Descriptor |
|---|---|
| slice_segment_header( ) { | |
| ... | |
|   if( nal_unit_type != IDR_W_RADL && nal_unit_type != IDR_N_LP ) { | |
|     slice_pic_order_cnt_lsb | u(v) |
|     short_term_ref_pic_set_sps_flag | u(1) |
|     if( !short_term_ref_pic_set_sps_flag ) | |
|       st_ref_pic_set( num_short_term_ref_pic_sets ) | |
|     else if( num_short_term_ref_pic_sets > 1 ) | |
|       short_term_ref_pic_set_idx | u(v) |
|     if( long_term_ref_pics_present_flag ) { | |
|       if( num_long_term_ref_pics_sps > 0 ) | |
|         num_long_term_sps | ue(v) |
|       num_long_term_pics | ue(v) |
|       for( i = 0; i < num_long_term_sps + num_long_term_pics; i++ ) { | |
|         if( i < num_long_term_sps ) { | |
|           if( num_long_term_ref_pics_sps > 1 ) | |
|             lt_idx_sps[ i ] | u(v) |
|         } else { | |
|           poc_lsb_lt[ i ] | u(v) |
|           used_by_curr_pic_lt_flag[ i ] | u(1) |
|         } | |
|         delta_poc_msb_present_flag[ i ] | u(1) |
|         if( delta_poc_msb_present_flag[ i ] ) | |
|           delta_poc_msb_cycle_lt[ i ] | ue(v) |
|       } | |
|     } | |
| ... | |

ITU-T H.265 provides the following definitions for the respective syntax elements illustrated in Table 3.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0, except in some case specificed in ITU-H.265.

short_term_ref_pic_set_sps_flag equal to 1 specifies that the short-term RPS of the current picture is derived based on one of the st_ref_pic_set( ) syntax structures in the active SPS that is identified by the syntax element short_term_ref_pic_set_idx_in the slice header. short_term_ref_pic_set_sps_flag equal to 0 specifies that the short-term RPS of the current picture is derived based on the st_ref_pic_set( ) syntax structure that is directly included in the slice headers of the current picture. When num_short_term_ref_pic_sets is equal to 0, the value of short_term_ref_pic_set_sps_flag shall be equal to 0.

short_term_ref_pic_set_idx_specifies the index, into the list of the st_ref_pic_set( ) syntax structures included in the active SPS, of the st_ref_pic_set( ) syntax structure that is used for derivation of the short-term RPS of the current picture. The syntax element short_term_ref_pic_set_idx_is represented by Ceil(Log 2(num_short_term_ref_pic_sets)) bits. When not present, the value of short_term_ref_pic_set_idx_is inferred to be equal to 0. The value of short_term_ref_pic_set_idx_shall be in the range of 0 to num_short_term_ref_pic_sets−1, inclusive.

The variable CurrRpsIdx is derived as follows:
If short_term_ref_pic_set_sps_flag is equal to 1, CurrRpsIdx is set equal to short_term_ref_pic_set_idx.
Otherwise, CurrRpsIdx is set equal to num_short_term_ref_pic_sets.

num_long_term_sps specifies the number of entries in the long-term RPS of the current picture that are derived based on the candidate long-term reference pictures specified in the active SPS. The value of num_long_term_sps shall be in the range of 0 to num_long_term_ref_pics_sps, inclusive. When not present, the value of num_long_term_sps is inferred to be equal to 0.

num_long_term_pics specifies the number of entries in the long-term RPS of the current picture that are directly signalled in the slice header. When not present, the value of num_long_term_pics is inferred to be equal to 0.

When nuh_layer_id is equal to 0, the sum of NumNegativePics[CurrRpsIdx], NumPositivePics[CurrRpsIdx], num_long_term_sps and num_long_term_pics shall be less than or equal to sps_max_dec_pic_buffering_minus1[sps_max_sub_layers_minus1].

lt_idx_sps[i] specifies an index, into the list of candidate long-term reference pictures specified in the active SPS, of the i-th entry in the long-term RPS of the current picture. The number of bits used to represent lt_idx_sps[i] is equal to Ceil(Log 2(num_long_term_ref_pics_sps)). When not present, the value of lt_idx_sps[i] is inferred to be equal to 0. The value of lt_idx_sps[i] shall be in the range of 0 to num_long_term_ref_pics_sps−1, inclusive.

poc_lsb_lt[i] specifies the value of the picture order count modulo MaxPicOrderCntLsb of the i-th entry in the long-term RPS of the current picture. The length of the poc_lsb_lt[i] syntax element is log 2_max_pic_order_cnt_lsb_minus4+4 bits.

used_by_curr_pic_lt_flag[i] equal to 0 specifies that the i-th entry in the long-term RPS of the current picture is not used for reference by the current picture. The variables PocLsbLt[i] and UsedByCurrPicLt[i] are derived as follows:
If i is less than num_long_term_sps, PocLsbLt[i] is set equal to lt_ref_pic_poc_lsb_sps[lt_idx_sps[i]] and UsedByCurrPicLt[i] is set equal to used_by_curr_pic_lt_sps_flag[lt_idx_sps[i]].
Otherwise, PocLsbLt[i] is set equal to poc_lsb_lt[i] and UsedByCurrPicLt[i] is set equal to used_by_curr_pic_lt_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present.

delta_poc_msb_cycle_lt[i] is used to determine the value of the most significant bits of the picture order count value of the i-th entry in the long-term RPS of the current picture. When delta_poc_msb_cycle_lt[i] is not present, it is inferred to be equal to 0.

The variable DeltaPocMsbCycleLt[i] is derived as follows:

```
if( i == 0 || i == num_long_term_sps )
    DeltaPocMsbCycleLt[ i ] = delta_poc_msb_cycle_lt[ i ]
else
    DeltaPocMsbCycleLt[ i ] = delta_poc_msb_cycle_lt[ i ] +
DeltaPocMsbCycleLt[ i − 1 ]
```

As described above, in ITU-T H.265 PocStCurrBefore, PocStCurrAfter, PocStFoll, PocLtCurr and PocLtFoll are constructed to derive the RPS. ITU-T H.265 provides the following with respect to constructing PocStCurrBefore, PocStCurrAfter, PocStFoll, PocLtCurr and PocLtFoll:

If the current picture is an IDR picture, PocStCurrBefore, PocStCurrAfter, PocStFoll, PocLtCurr and PocLtFoll are all set to be empty, and NumPocStCurrBefore, NumPocStCurrAfter, NumPocStFoll, NumPocLtCurr and NumPocLtFoll are all set equal to 0.

Otherwise, the following applies:

```
for( i = 0, j = 0, k = 0; i < NumNegativePics[ CurrRpsIdx ] ;i++ )
  if( UsedByCurrPicS0[ CurrRpsIdx ][ i ] )
    PocStCurrBefore[ j++ ] = PicOrderCntVal + DeltaPocS0
    [ CurrRpsIdx ][ i ]
  else
    PocStFoll[ k++ ] = PicOrderCntVal + DeltaPocS0[ CurrRpsIdx ] [ i ]
NumPocStCurrBefore = j
for( i = 0, j = 0; i < NumPositivePics[ CurrRpsIdx ]; i++ )
  if( UsedByCurrPicS1[ CurrRpsIdx ][ i ] )
    PocStCurrAfter[j++] = PicOrderCntVal + DeltaPocS1[ CurrRpsIdx ]
    [ i ]
  else
    PocStFoll[ k++ ] = PicOrderCntVal + DeltaPocS1[ CurrRpsIdx ][ i ]
NumPocStCurrAfter = j
NumPocStFoll = k
for( i = 0, j = 0, k = 0; i < num_long_term_sps + num_long_term_pics;
i++ ) {
  pocLt = PocLsbLt[ i ]
  if( delta_poc_msb_present_flag[ i ] )
    pocLt += PicOrderCntVal − DeltaPocMsbCycleLt[ i ]*
    MaxPicOrderCntLsb − ( PicOrderCntVal & (MaxPicOrderCntLsb −
    1 ) )
  if( UsedByCurrPicLt[ i ] ) {
    PocLtCurr[ j ] = pocLt
    CurrDeltaPocMsbPresentFlag[     j++     ]     =
    delta_poc_msb_present_flag[ i ]
  } else {
    PocLtFoll[ k ] = pocLt
    FollDeltaPocMsbPresentFlag[     k++     ]     =
    delta_poc_msb_present_flag[ i ]
  }
}
NumPocLtCurr = j
NumPocLtFoll = k
```

ITU-T H.265 further provides where PocStCurrBefore, PocStCurrAfter, PocStFoll, PocLtCurr, and PocLtFoll are used to derive the five RPS lists for the current picture (RefPicSetStCurrBefore, RefPicSetStCurrAfter, RefPicSetStFoll, RefPicSetLtCurr and RefPicSetLtFoll) as follows:

```
1. The following applies:
    for( i= 0; i < NumPocLtCurr; i++ )
      if( !CurrDeltaPocMsbPresentFlag[ i ] )
        if( there is a reference picture picX in the DPB with
PicOrderCntVal & ( MaxPicOrderCntLsb − 1 )
            equal to PocLtCurr[ i ] and nuh_layer_id
equal to currPicLayerId )
          RefPicSetLtCurr[ i ] = picX
        else
          RefPicSetLtCurr[ i ] = "no reference picture"
      else
        if( there is a reference picture picX in the DPB with PicOrderCntVal
equal to PocLtCurr[ i ]
            and nuh_layer_id equal to currPicLayerId )
          RefPicSetLtCurr[ i ] = picX
        else
          RefPicSetLtCurr[ i ] = "no reference picture"
    for( i = 0; i < NumPocLtFoll; i++ )
      if( !FollDeltaPocMsbPresentFlag[ i ] )
        if( there is a reference picture picX in the DPB with
PicOrderCntVal & ( MaxPicOrderCntLsb − 1 )
            equal to PocLtFoll[ i ] and nuh_layer_id
equal to currPicLayerId )
          RefPicSetLtFoll[ i ] = picX
        else
          RefPicSetLtFoll[ i ] = "no reference picture"
      else
        if( there is a reference picture picX in the DPB with PicOrderCntVal
equal to PocLtFoll[ i ]
            and nuh_layer_id equal to currPicLayerId )
          RefPicSetLtFoll[ i ] = picX
        else
          RefPicSetLtFoll[ i ] = "no reference picture"
2. All reference pictures that are included in RefPicSetLtCurr or RefPicSetLtFoll
  and have nuh_layer_id equal to currPicLayerId are marked as "used for
  long-term reference".
3. The following applies:
    for( i = 0; i < NumPocStCurrBefore; i++ )
      if( there is a short-term reference picture picX in the DPB
          with PicOrderCntVal equal to PocStCurrBefore[ i ] and nuh_layer_id
equal to currPicLayerId )
        RefPicSetStCurrBefore[ i ] = picX
      else
        RefPicSetStCurrBefore[ i ] = "no reference picture"
    for( i = 0; i < NumPocStCurrAfter; i++ )
      if( there is a short-term reference picture picX in the DPB
          with PicOrderCntVal equal to PocStCurrAfter[ i ] and nuh_layer_id
```

```
equal to currPicLayerId )
    RefPicSetStCurrAfter[ i ] = picX
  else
    RefPicSetStCurrAfter[ i ] = "no reference picture"
for( i = 0; i < NumPocStFoll; i++ )
  if( there is a short-term reference picture picX in the DPB
      with PicOrderCntVal equal to PocStFoll[ i ] and nuh_layer_id equal
  to currPicLayerId )
    RefPicSetStFoll[ i ] = picX
  else
    RefPicSetStFoll[ i ] = "no reference picture"
```
4. All reference pictures in the DPB that are not included in RefPicSetLtCurr, RefPicSetLtFoll, RefPicSetStCurrBefore, RefPicSetStCurrAfter, or RefPicSetStFoll and have nuh_layer_id equal to currPicLayerId are marked as "unused for reference".

Finally, in ITU-T H.265 a decoding process is performed for construction of one or two temporary reference picture list(s) using the five RPS lists. The one or two temporary reference picture list(s) that are constructed may optionally be modified (i.e., re-indexed). The modified or unmodified temporary reference picture list(s) are used to create a final reference picture list(s). The index values of the reference picture list(s) are used to identify a picture during inter prediction.

According to the techniques herein, a simplified process for generating a reference picture lists is described. According to the techniques herein, reference picture lists may be signaled directly. As described in further detail below, in one example, according to the techniques herein, reference picture lists may be signaled directly as follows: a set of candidate picture lists may be signaled in the SPS and one to three indices to the SPS candidate picture lists may be signaled in the slice segment header or new reference picture lists may be signaled directly in slice segment header; the one or two final reference picture lists may be created based on the signaled indices. Additionally, reference pictures are marked based on one, two, or three reference picture lists. The techniques described herein result is a more simplified decoding process compared to the ITU-T H.265 approach. Further, direct signaling of reference picture lists avoids requiring signaling of reference picture list modification syntax on top of reference picture set syntax.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
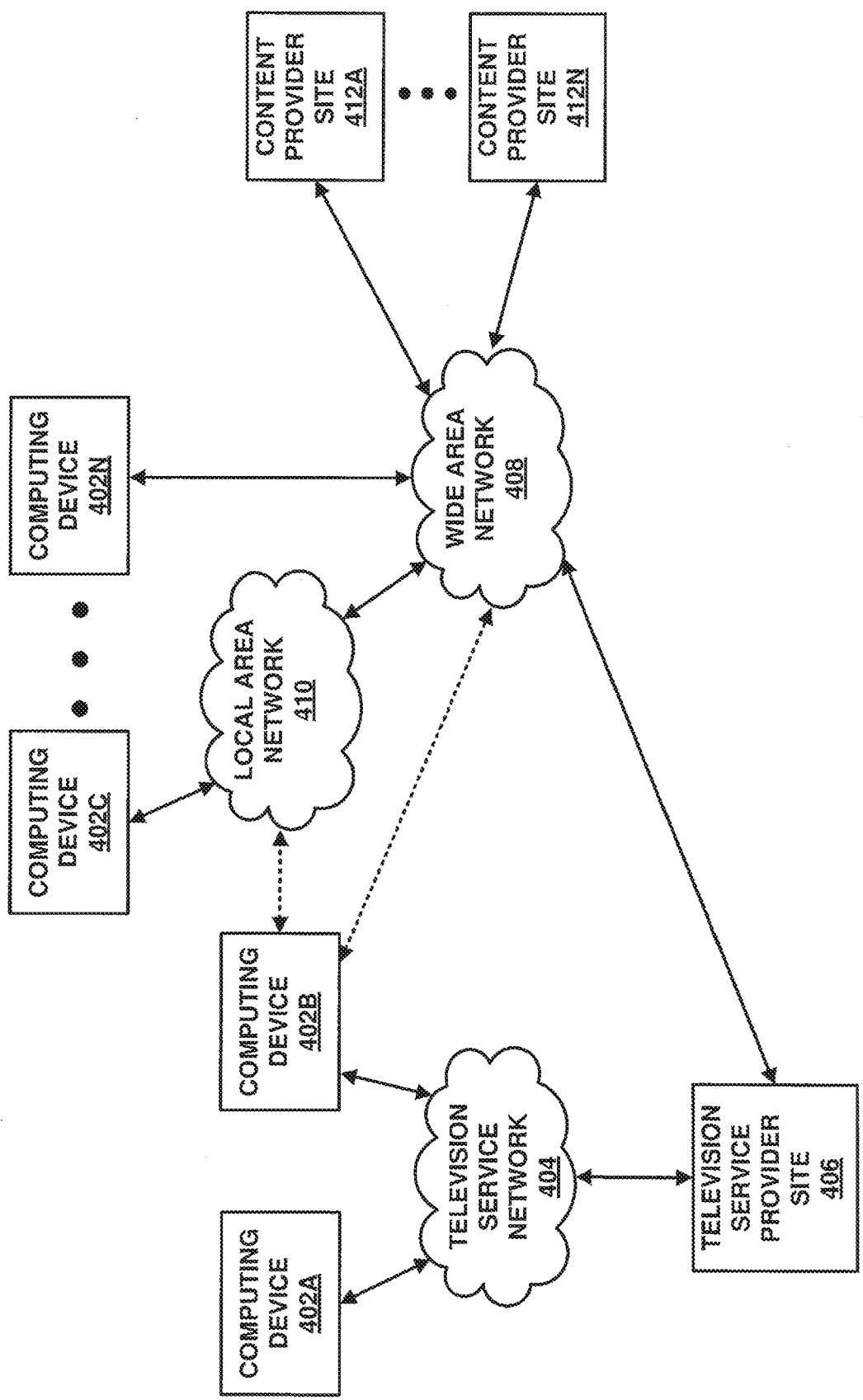
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
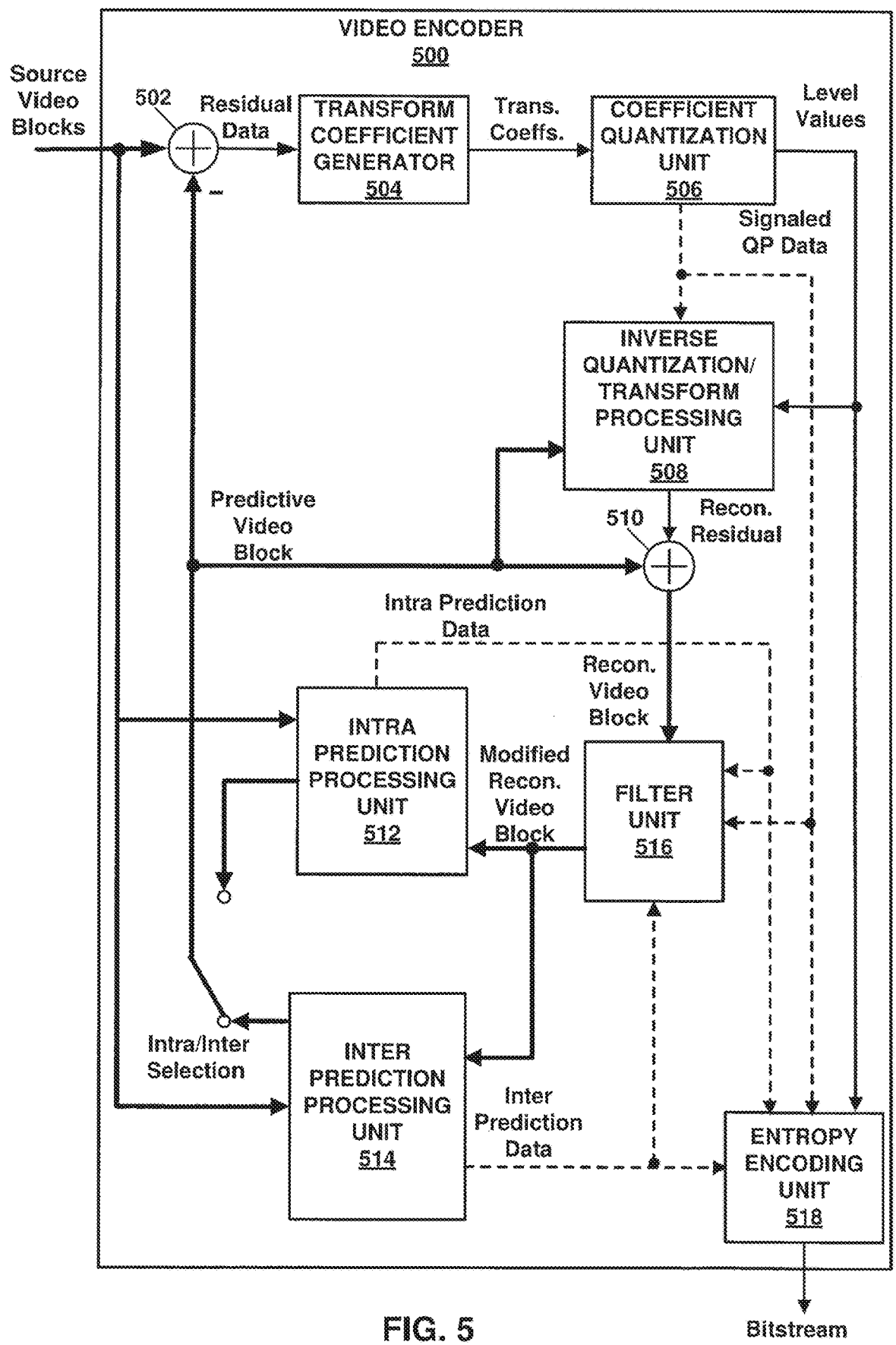
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional subdivisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bipredictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, in one example, according to the techniques herein, reference picture lists may be signaled directly as follows: a set of candidate picture lists may be signaled in the SPS (or other parameter set, e.g., VPS) and one to three indices to the SPS candidate picture lists may be signaled in the slice segment header or new reference picture lists may be signaled directly in slice segment header. A slice segment header may is some cases be referred to as a segment header. Table 4 illustrates an example of relevant syntax that may be included in an SPS and Table 5 illustrates an example of relevant syntax in the a slice segment header that may be used for directly signaling reference picture lists according to the techniques herein. It should be noted that syntax included in Table 4 is not limited to being included in an SPS (e.g., the syntax may be included in a parameter set) and syntax included in Table 5 is not limited to being included in a slice segment header (e.g., the syntax may be included in a header associated with another type of picture region, e.g., a picture header or a tile set header).

TABLE 4

| | Descriptor |
|---|---|
| seq_parameter_set_rbsp( ) { | |
| ... | |
|   num_ref_pic_lists_minus1 | ue(v) |
|   for( i = 1; i < num_ref_pic_lists_minus1+1; i++) | |
|     pic_list( i ) | |
|   rbsp_trailing_bits( ) | |
| } | |

TABLE 5

| | Descriptor |
|---|---|
| slice_header( ) { | |
| ... | |
|   num_rpl_slice_header_minus1 | u(2) |
|   rpl_sps_flag | u(1) |
|   if( !rpl_sps_flag ) { | |
|     for( i = num_ref_pic_lists_minus1+1; i < num_ref_pic_lists_minus1+num_rpl_slice_header_minus1+2; i++) | |
|       pic_list(i) | |
|   } | |
|   else { | |
|     for( j = 0; j < num_rpl_slice_header minus1+1; j++) | |
|       rpl_index[j] | u(v) |
|   } | |
|   byte_alignment( ) | |
| } | |

In one example, the following definitions may be used for the respective syntax elements illustrated in Table 4.

num_ref_pic_lists_minus1 specifies the number of pic_lists(i) syntax structures included in the SPS. The value of num_ref_pic_lists_minus1 shall be in the range of 0 to 255, inclusive.

pic_list(0) is inferred to be a null list of pictures. Thus pic_list(0) does not include any pictures.

A decoder should allocate memory for a total number of (num_ref_pic_lists_minus1+4) pic_list( ) syntax structures since there may be up to 3 pic_list( ) syntax structure directly signalled in the slice headers of a current picture.

In one example, the following definitions may be used for the respective syntax elements illustrated in Table 5.

num_rpl_slice_header_minus1 specifies the number of pic_lists(i) syntax structures signaled directly in the slice header if rpl_sps_flag is equal to 0 or specifies the number of rpl_index[j] entries signaled in the slice header if rpl_sps_flag is equal to 1. The value of num_rpl_slice_header_minus1 shall be in the range of 0 to 2, inclusive. The value 3 is reserved.

rpl_sps_flag equal to 1 specifies that the reference picture list(s) for the current picture are signaled based on pic_list( ) syntax structures in the active SPS as identified by the syntax element(s) rpl_idx[j] in the slice header. rpl_sps_flag equal to 0 specifies that the the reference picture list(s) for the current picture are signaled in the pic_list( ) syntax structure(s) that are directly signaled in the slice headers of the current picture.

rpl_idx[j] specifies the indices for reference picture list(s). rpl_idx[0] specifies an index for the reference picture list 0 for the current picture. If present, rpl_idx[1] specifies an index for the reference picture list 1 if current slice is a B slice and specifies an index for the list of pictures which include reference pictures for pictures following the current picture in the bitstream order, if the current slice is a P slice. If present, rpl_idx[2] specifies an index for the list of pictures which include reference pictures for pictures following the current picture in the bitstream order.

The syntax element rpl_idx[j] for j in the range of 0 to num_rpl_slice_header_minus1 inclusive is represented by Ceil(Log 2(num_ref_pic_lists_minus1+1)) bits. The value of rpl_idx[j] shall be in the range of 0 to num_ref_pic_lists_minus1, inclusive.

Table 6 illustrates an example of pic_list syntax according to the techniques herein.

TABLE 6

|  | Descriptor |
|---|---|
| pic_list( listIdx ) { |  |
|   if(listIdx>2) |  |
|     inv_list_flag | u(1) |
|   if(inv_list_flag==0) { |  |
|     neg_delta_entries | ue(v) |
|     pos_delta_entries | ue(v) |
|     for( i = 0; i < neg_delta_entries+pos_delta_entries; i++ ) |  |
|       delta_entries_minus1[ i ] | ue(v) |
|   } |  |
| } |  |

Table 7 illustrates another example of pic_list syntax according to the techniques herein.

TABLE 7

|  | Descriptor |
|---|---|
| pic_list( listIdx ) { |  |
|   if(listIdx>2) |  |
|     inv_list_flag | u(1) |
|   if(inv_list_flag==0) { |  |
|     neg_delta_entries | ue(v) |
|     pos_delta_entries | ue(v) |
|     for( i = 0; i < neg_delta_entries; i++ ) { |  |
|       delta_entries_minus1[ i ] | ue(v) |
|     } |  |
|     for( i = neg_delta_entries; i < neg_delta_entries+pos_delta_entries; i++ ) { |  |
|       delta_entries_minus1[ i ] | ue(v) |
|     } |  |
|   } |  |
| } |  |

In one example, the following definitions may be used for the respective syntax elements illustrated in Table 6 and Table 7.

inv_list_flag equal to 1 specifies that the listIdx-th list of pictures is derived from (listIdx-1)-th list of pictures by inverting the sign of each delta POC value in the (listIdx-1)-th list. inv_list_flag equal to 0 specifies that the listIdx-th list of pictures is signaled. When inv_list_flag is not present, it is inferred to be equal to 0.

neg_delta_entries specifies the number of entries in the listIdx-th list of pictures that have picture order count values less than the picture order count value of the current picture. The value of neg_delta_entries shall be in the range of 0 to sps_max_dec_pic_buffering_minus1[sps_max_sub_layers_minus1], inclusive.

pos_delta_entries specifies the number of entries in the listIdx-th list of pictures that have picture order count values greater than the picture order count value of the current picture. The value of pos_delta_entries shall be in the range of 0 to sps_max_dec_pic_buffering_minus1[sps_max_sub_layers_minus1]− neg_delta_entries, inclusive.

With respect to the example illustrated in Table 6, in one example, the following definitions may be used for syntax element delta_entries_minus1.

delta_entries_minus1[i] plus 1, when i is equal to 0, specifies the difference between the picture order count values of the current picture and i-th entry in the listIdx-th list of pictures that has picture order count value less than that of the current picture, or, when i is greater than 0 and less than neg_delta_entries, specifies the difference between the picture order count values of the i-th entry and the (i+1)-th entry in the listIdx-th list of pictures that have picture order count values less than the picture order count value of the current picture, or, when i is equal to neg_delta_entries, specifies the difference between the picture order count values of the current picture and the i-th entry in the listIdx-th list of pictures that has picture order count value greater than that of the current picture, or, when i is greater than neg_delta_entries, specifies the difference between the picture order count values of the (i+1)-th entry and i-th entry in the listIdx-th list of pictures that have picture order count values greater than the picture order count value of the current picture.

The value of delta_entries_minus1[i] shall be in the range of 0 to $2^{15}-1$, inclusive.

When inv_list_flag is equal to 0, the variables NumNegativePics[listIdx], NumPositivePics[listIdx], NumPositivePics[listIdx], DeltaPoc[listIdx][i] are derived as follows:

NumNegativePics[listIdx]=neg_delta_entries
NumPositivePics[listIdx]=pos_delta_entries
NumDeltaPocs[listIdx]=NumNegativePics[listIdx]+NumPositivePics[listIdx]

If i is equal to 0, the following applies:
DeltaPoc[listIdx][i]=−(delta_entries_minus1[0]+1)

If i is >0 and less than neg_delta_entries, the following applies:
DeltaPoc[listIdx][i]=DeltaPoc[listIdx][i−1]−(delta_entries_minus1[i]+1)

If i is equal to neg_delta_entries, the following applies:
DeltaPoc[listIdx][neg_delta_entries]=delta_entries_minus1[i]+1

If i is >neg_delta_entries, the following applies:
DeltaPoc[listIdx][i]=DeltaPoc[listIdx][i−1]+(delta_entries_minus1[i]+1)

When inv_list_flag is equal to 1, the variables NumNegativePics[listIdx], NumPositivePics[listIdx], NumDeltaPocs[listIdx], DeltaPoc[listIdx][i] are derived as follows:

NumNegativePics[listIdx]=NumPositivePics[listIdx−1]
NumPositivePics[listIdx]=NumNegativePics[listIdx−1]
NumDeltaPocs[listIdx]=NumDeltaPocs[listIdx−1]

For i in the range of 0 to NumDeltaPocs[listIdx], inclusive the following applies:
DeltaPoc[listIdx][i]=−(DeltaPoc[listIdx−1][i])

With respect to the example illustrated in Table 7, in one example, the following definitions may be used for syntax element delta_entries_minus1.

delta_entries_minus1[i] plus 1, when i is equal to 0, specifies the difference between the picture order count values of the current picture and i-th entry in the listIdx-th list of pictures that has picture order count value less than that of the current picture, or, when i is greater than 0 and less than neg_delta_entries, specifies the difference between the picture order count values of the i-th entry and the (i+1)-th entry in the listIdx-th list of pictures that have picture order count values less than the picture order count value of the current picture, or, when i is equal to neg_delta_entries, specifies the difference between the picture order count values of the current picture and the i-th entry in the listIdx-th list of pictures that has picture order count value greater than that of the current picture, or, when i is greater than neg_delta_entries, specifies the difference between the picture order count values of the (i+1)-th entry and i-th entry in the listIdx-th list of pictures that have picture order count values greater than the picture order count value of the current picture.

The value of delta_entries_minus1[i] shall be in the range of 0 to $2^{15}-1$, inclusive.

When inv_list_flag is equal to 0, the variables NumNegativePics[listIdx], NumPositivePics[listIdx], DeltaPocS0[listIdx][i], and DeltaPocS1[listIdx][i] are derived as follows:

NumNegativePics[listIdx]=neg_delta_entries
NumPositivePics[listIdx]=pos_delta_entries
If i is equal to 0, the following applies:
   DeltaPocS0[listIdx][i]=−(neg_delta_entries_minus1[i]+1)
   DeltaPocS1[listIdx][i]=pos_delta_entries_minus1[i]+1
Otherwise, the following applies:
   DeltaPocS0[listIdx][i]=DeltaPocS0[stRpsIdx][i−1]−(neg_delta_entries_minus1[i]+1+)
   DeltaPocS1[listIdx][i]=DeltaPocS1[stRpsIdx][i−1]+(pos_delta_entries_minus1[i]+1

The variable NumDeltaPocs[listIdx] is derived as follows:
NumDeltaPocs[listIdx]=NumNegativePics[listIdx]+NumPositivePics[listIdx]

Based on the syntax provided above in Tables 4-7, in one example, a process for deriving reference picture lists (RPL)s, i.e., a process performed by a video decoder at the onset of decoding a picture may be performed according to and/or based the following steps:
The Following Applies:
The variable CurrRPListIdx[j] for j in the range of 0 to num_rpl_slice_header_minus1, inclusive, is derived as follows:
   If rpl_sps_flag is equal to 1, CurrRPListIdx[j] is set equal to rpl_idx[j].
   Otherwise, CurrRPListIdx[j] is set equal to rpl_idx[num_ref_pic_lists_minus1+j+1].
The following applies for j in the range of 0 to num_rpl_slice_header_minus1, inclusive,

```
for( i = 0; i < NumDeltaPocs[ CurrRPListIdx[j] ]; i++ )
    if( there is a short-term reference picture picX in the DPB
        with PicOrderCntVal equal to (PicOrderCntVal +
    DeltaPoc[ CurrRPListIdx[j] ][ i ]) )
        RefPics[ j ][ i ] = picX
    else
        RefPics[ j ][ i ] = "no reference picture"
```

All reference pictures in the DPB that are not included in RefPics[j] for j in the range of 0 to num_rpl_slice_header_minus1, inclusive, are marked as "unused for reference".

In one example, for the case where Otherwise, CurrRPListIdx[j] is set equal to rpl_idx[num_ref_pic_lists_minus1+j+1] the following may be performed

```
for( i = 0; i < NumDeltaPocs[ CurrRPListIdx[j] ] ; i++ )
    PocSt[ i ] = PicOrderCntVal +
DeltaPoc[ CurrRPListIdx[j] ][ i ]
for( i = 0; i < NumDeltaPocs[ CurrRPListIdx[j] ]; i++ )
    if( there is a short-term reference picture picX in the DPB
        with PicOrderCntVal equal to PocSt [ i ] )
        RefPics[ j ][ i ] = picX
    else
        RefPics[ j ][ i ] = "no reference picture"
```

Further, based on the syntax provided above in Tables 4-7, in one example, a process for reference picture lists construction, i.e., a process performed by a video decoder at the beginning of the decoding process for each P or B slice for constructing the reference picture lists RefPicList0 and, for B slices, RefPicList1 may be as performed based on the following:

The variable NumRpsCurrList0 is set equal to Max(num_ref_idx_l0_active_minus1+1, NumDeltaPocs[CurrRPListIdx[0]]) and the list RefPicList0 is constructed as follows:

```
for( i = 0, rIdx=0; i < NumDeltaPocs[ CurrRPListIdx[0] ] &&   rIdx <
NumRpsCurrList0; rIdx++, i++ )
    RefPicList0[ rIdx ] = RefPics[ 0 ][ i ]
```

When the slice is a B slice, the variable NumRpsCurrList1 is set equal to Max(num_ref_idx_l1_active_minus1+1, NumDeltaPocs[CurrRPListIdx[0]]) and the list RefPicList1 is constructed as follows:

```
for( i = 0, rIdx=0; i < NumDeltaPocs[ CurrRPListIdx[1] ] &&   rIdx <
NumRpsCurrList1; rIdx++, i++ )
    RefPicList1[ rIdx ] = RefPics[ 1 ][ i ]
```

In another example, constructing the reference picture lists RefPicList0 and, for B slices, RefPicList1 may be as performed based on the following, where a RPL modification may be present:
The list RefPicList0 is constructed as follows.
The RefPicList0 entires above are assigned to RefPicListTemp0 and RefPicList1 entires above are assigned to RefPicListTemp1 array respectively. Then final reference picture lists are derived as

```
for( rIdx = 0; rIdx   <=   num_ref_idx_l0_active_minus1; rIdx++)
    RefPicList0[ rIdx ] = ref_pic_list_modification_flag_l0 ?
RefPicListTemp0[ list_entry_l0[ rIdx ] ] : RefPicListTemp0[ rIdx ]
```

When the slice is a B slice, the list RefPicList1 is constructed as follows:

```
for( rIdx = 0; rIdx   <=   num_ref_idx_l1_active_minus1; rIdx++)
    RefPicList1[ rIdx ]   =   ref_pic_list_modification_flag_l1 ?
RefPicListTemp1[ list_entry_l1[ rIdx ] ] :    RefPicListTemp1[ rIdx ]
```

Further, based on the syntax provided above in Tables 4-7, in one example, a process for generating unavailable reference pictures may be performed according to and/or based the following steps:
This process is invoked once per coded picture.
When this process is invoked, the following applies:
For each RefPics[j][i], with i in the range of 0 to NumDeltaPocs[CurrRPListIdx[j]], inclusive, for j in the range 0 to num_rpl_slice_header_minus1, inclusive, that is equal to "no reference picture", a picture is generated as specified in "generation of one unavailable picture", and the following applies:

The value of PicOrderCntVal for the generated picture is set equal to PicOrderCntVal+DeltaPoc[CurrR-PListIdx[j]][i].

The generated picture is marked as "used for short-term reference".

RefPics[j][i], is set to be the generated reference picture.

Further, based on the syntax provided above in Tables 4-7, in one example, a process for generating one unavailable reference pictures may be performed according to and/or based the following steps:

When this process is invoked, an unavailable picture is generated as follows:

The value of each element in the sample array $S_L$ for the picture is set equal to 1<<(BitDepthY−1).

The value of each element in the sample arrays $S_{Cb}$ and $S_{Cr}$ for the picture is set equal to 1<<(BitDepthc−1).

The prediction mode CuPredMode[x][y] is set equal to MODE_INTRA for x=0 . . . pic_width_in_luma_samples−1, y=0 . . . pic_height_in_luma_samples−1.

Further, based on the syntax provided above in Tables 4-7, in one example, a process for selecting a reference picture may be performed according to and/or based the following steps:

Input to this process is a reference index refIdxLX.

Output of this process is a reference picture consisting of a two-dimensional array of luma samples refPicLX$_L$ and two two-dimensional arrays of chroma samples refPicLX$_{Cb}$ and refPicLX$_{Cr}$.

The output reference picture RefPicListX[refIdxLX] consists of a pic_width_in_luma_samples by pic_height_in_luma_samples array of luma samples refPicLX$_L$ and two PicWidthInSamplesC by PicHeightInSamplesC arrays of chroma samples refPicLX$_{Cb}$ and refPicLX$_{Cr}$.

The reference picture sample arrays refPicLX$_L$, refPicLX$_{Cb}$, and refPicLX$_{Cr}$ correspond to decoded sample arrays $S_L$, $S_{Cb}$, and $S_{Cr}$ for a previously-decoded picture.

In one example, according to the techniques herein, long-term reference picture lists may be signaled directly, as provided in further detail below. Table 8 illustrates an example of relevant syntax that may be included in an SPS for signaling long-term reference picture lists directly. It should be noted that syntax included in Table 8 is not limited to being included in an SPS (e.g., the syntax may be included in a parameter set).

TABLE 8

| | Descriptor |
|---|---|
| seq_parameter_set_rbsp( ) { | |
| ... | |
| long_term_ref_pics_present_flag | u(1) |
| num_ref_pic_lists_minus1 | ue(v) |
| for( i = 1; i < num_ref_pic_lists_minus1+1; i++) | |
| pic_list( i ) | |
| rbsp_trailing_bits( ) | |
| } | |

In one example, the following definitions may be used for the respective syntax elements illustrated in Table 8.

long_term_ref_pics_present_flag equal to 0 specifies that no long-term reference picture is used for inter prediction of any coded picture in the CVS. long_term_ref_pics_present_flag equal to 1 specifies that long-term reference pictures may be used for inter prediction of one or more coded pictures in the CVS.

num_ref_pic_lists_minus1 specifies the number of pic_lists(i) syntax structures included in the SPS. The value of num_ref_pic_lists_minus1 shall be in the range of 0 to 255, inclusive.

pic_list(0) is inferred to be a null list of pictures. Thus pic_list(0) does not include any pictures.

A decoder should allocate memory for a total number of (num_ref_pic_lists_minus1+4) pic_list( ) syntax structures since there may be up to 3 pic_list( ) syntax structure directly signalled in the slice headers of a current picture.

Table 9 illustrates an example of pic_list syntax that may be used in conjunction with the example syntax illustrated in Table 8.

TABLE 9

| | Descriptor |
|---|---|
| pic_list( listIdx ) { | |
| if(listIdx>2) | |
| inv_list_flag | u(1) |
| if(inv_list_flag==0) { | |
| neg_delta_entries | ue(v) |
| pos_delta_entries | ue(v) |
| for( i = 0; i < neg_delta_entries+pos_delta_entries; i++ ) | |
| delta_entries_minus1[ i ] | ue(v) |
| } | |
| if(long_term_ref_pics_present_flag) { | |
| ltrp_list_present_flag | |
| if( ltrp_list_present_flag) { | |
| num_long_term_pics_minus1 | ue(v) |
| for( j = 0; j < num_long_term_pics_minus1+1; j++ ) { | |
| poc_lsb_lt[ j ] | u(v) |
| delta_poc_msb_present_flag[ j ] | u(1) |
| if( delta_poc_msb_present_flag[ j ] ) | |
| delta_poc_msb_cycle_lt[ j ] | ue(v) |
| } | |
| } | |
| } | |
| } | |

In one example, the following definitions may be used for the respective syntax elements illustrated in Table 9.

inv_list_flag equal to 1 specifies that the listIdx-th list of pictures is derived from (listIdx−1)-th list of pictures by inverting the sign of each delta POC value in the (listIdx−1)-th list. inv_list_flag equal to 0 specifies that the listIdx-th list of pictures is signaled. When inv_list_flag is not present, it is inferred to be equal to 0.

neg_delta_entries specifies the number of entries in the listIdx-th list of pictures that have picture order count values less than the picture order count value of the current picture. The value of neg_delta_entries shall be in the range of 0 to sps_max_dec_pic_buffering_minus1[sps_max_sub_layers_minus1], inclusive.

pos_delta_entries specifies the number of entries in the listIdx-th list of pictures that have picture order count values greater than the picture order count value of the current picture. The value of pos_delta_entries shall be in the range of 0 to sps_max_dec_pic_buffering_minus1[sps_max_sub_layers_minus1]− neg_delta_entries, inclusive.

delta_entries_minus1[i] plus 1, when i is equal to 0, specifies the difference between the picture order count values of the current picture and i-th entry in the listIdx-th list of pictures that has picture order count value less than that of the current picture, or, when i is greater than 0 and less than neg_delta_entries, specifies the difference between the picture order count values of the i-th entry and the (i+1)-th entry in the listIdx-th list of pictures that have picture order count values less than the picture order count value of the current picture, or, when i is equal to neg_delta_entries, specifies the difference between the picture order count values of the current picture and the i-th entry in the listIdx-th list of pictures that has picture order count value greater than that of the current picture, or, when i is greater than neg_delta_entries, specifies the difference between the picture order count values of the (i+1)-th entry and i-th entry in the listIdx-th list of pictures that have picture order count values greater than the picture order count value of the current picture.

The value of delta_entries_minus1[i] shall be in the range of 0 to $2^{15}-1$, inclusive.

ltrp_list_present_flag equal to 0 specifies that no long-term reference pictures are signaled in this picture list. ltrp_list_present_flag equal to 1 specifies that long-term reference pictures are signaled in this picture list and num_long_term_pics_minus1, poc_lst_lt[j], delta_poc_msb_present_flag[j] are present and delta_po_msb_cycle_lt[j] may be present. When not present ltrp_list_present_flag is inferred to be equal to 0.

num_long_term_pics_minus1 plus 1 specifies the number of long-term reference picture entries in the picture list. The sum of NumNegativePics[listIdx], NumPositivePics[listIdx], (num_long_term_pics_minus1+1) shall be less than or equal to sps_max_dec_pic_buffering_minus1[sps_max_sub_layers_minus1].

poc_lsb_lt[j] specifies the value of the picture order count modulo MaxPicOrderCntLsb of the j-th long-term reference picture in the list. The length of the poc_lsb_lt[i] syntax element is log 2_max_pic_order_cnt_lsb_minus4+4 bits.

delta_poc_msb_present_flag[j] equal to 1 specifies that delta_poc_msb_cycle_lt[j] is present. delta_poc_msb_present_flag[j] equal to 0 specifies that delta_poc_msb_cycle_lt[j] is not present.

delta_poc_msb_cycle_lt[j] is used to determine the value of the most significant bits of the picture order count value of the j-th long-term reference picture in the list. When delta_poc_msb_cycle_lt[j] is not present, it is inferred to be equal to 0. The variable DeltaPocMsbCycleLt[j] is derived as follows:

```
if( j == 0 )
   DeltaPocMsbCycleLt[ j ] = delta_poc_msb_cycle_lt[ j ]
else
   DeltaPocMsbCycleLt[ j ] = delta_poc_msb_cycle_lt[ j ] +
      DeltaPocMsbCycleLt[ j − 1 ]
```

When inv_list_flag is equal to 0, the variables NumNegativePics[listIdx], NumPositivePics[listIdx], NumPositivePics[listIdx], DeltaPoc[listIdx][i] are derived as follows:
NumNegativePics[listIdx]=neg_delta_entries
NumPositivePics[listIdx]=pos_delta_entries
NumDeltaPocs[listIdx]=NumNegativePics[listIdx]+NumPositivePics[listIdx]

If i is equal to 0, the following applies:
DeltaPoc[listIdx][i]=−(delta_entries_minus1[0]+1)

If i is >0 and less than neg_delta_entries, the following applies:
DeltaPoc[listIdx][i]=DeltaPoc[listIdx][i−1]−(delta_entries_minus1[i]+1)

If i is equal to neg_delta_entries, the following applies:
DeltaPoc[listIdx][neg_delta_entries]=delta_entries_minus1[i]+1

If i is >neg_delta_entries, the following applies:
DeltaPoc[listIdx][i]=DeltaPoc[listIdx][i−1]+(delta_entries_minus1[i]+1)

When inv_list_flag is equal to 1, the variables NumNegativePics[listIdx], NumPositivePics[listIdx], NumDeltaPocs[listIdx], DeltaPoc[listIdx][i] are derived as follows:

```
NumNegativePics[ listIdx ] = NumPositivePics[ listIdx-1 ]
NumPositivePics[ listIdx ] = NumNegativePics[ listIdx-1 ]
NumDeltaPocs[ listIdx ] = NumDeltaPocs[ listIdx-1 ]
- For i in the range of 0 to NumDeltaPocs[ listIdx ], inclusive
   the following applies:
      DeltaPoc[ listIdx ][ i ] = −( DeltaPoc[ listIdx−1 ][ i ] )
If ltrp_list_present_flag is equal to 0 NumPocLt[ listIdx ] is set equal to 0
Otherwise: NumPocLt[ listIdx ] = num_long_term_pics_minus1+1
for( j = 0; j < num_long_term_pics_minus1+1; j++ ) {
   DpocLt[ listIdx ][ j ] = poc_lsb_lt[ j ] −
   (delta_poc_msb_present_flag[ j ] ?
DeltaPocMsbCycleLt[ j ]*MaxPicOrderCntLsb : 0)
      DeltaPocMsbPresentFlag[ listIdx ][ j ] =
      delta_poc_msb_present_flag[ j ]
}
```

Based on the syntax provided above in Table 8 and Table 9, in one example, a process for deriving reference picture lists (RPL)s may be performed according to and/or based the following steps. The steps may be executed in sequence shown below or in a different order:

The Following Applies:

The variable CurrRPListIdx[j] for j in the range of 0 to num_rpl_slice_header_minus1, inclusive, is derived as follows:

If rpl_sps_flag is equal to 1, CurrRPListIdx[j] is set equal to rpl_idx[j].

Otherwise, CurrRPListIdx[j] is set equal to rpl_idx[num_ref_pic_lists_minus1+j+1].

The following applies for j in the range of 0 to num_rpl_slice_header_minus1, inclusive,

```
for( i = 0; i < NumDeltaPocs[ CurrRPListIdx[j] ]; i++ )
   if( there is a short-term reference picture picX in the DPB
      with PicOrderCntVal equal to (PicOrderCntVal +
DeltaPoc[ CurrRPListIdx[j] ][ i ]) )
         RefPics[ j ][ i ] = picX
   else
      RefPics[ j ][ i ] = "no reference picture"
```

The following applies for j in the range of 0 to num_rpl_slice_header_minus1, inclusive:

```
for( m = 0; m< NumPocLt [CurrRPListIdx[j] ]; m++ )
    if( ! DeltaPocMsbPresentFlag[CurrRPListIdx[j] ][ m ] )
        if( there is a reference picture picX in the DPB with
slice_pic_order_cnt_lsb equal to DPocLt[CurrRPListIdx[j] ] [ m ] )
            RefPics[ j ][ NumDeltaPocs[ CurrRPListIdx[j] ]+m ] = picX
        else
            RefPics[ j ][ NumDeltaPocs[ CurrRPListIdx[j] ]+m ] = "no
reference picture"
    else
        if( there is a reference picture picX in the DPB with PicOrderCntVal
equal to (DPocLt[CurrRPListIdx[j] ][ m ]-slice_pic_order_cnt_lsb+ PicOrderCntVal))
            RefPics[ j ][ NumDeltaPocs[ CurrRPListIdx[j] ]+m ] = picX
        else
            RefPics[ j ][ NumDeltaPocs[ CurrRPListIdx[j] ]+m ] = "no
reference picture"
```

All reference pictures that are included in RefPics[j][k] for k in the range NumDeltaPocs[CurrRPListIdx[j]] to NumDeltaPocs[CurrRPListIdx[j]]+NumPocLt [CurrRPListIdx[j]]−1], inclusive, for j in the range of 0 to num_rpl_slice_header_minus1, inclusive, are marked as "used for long-term reference".

All reference pictures in the DPB that are not included in RefPics[j] for j in the range of 0 to num_rpl_slice_header_minus1, inclusive, are marked as "unused for reference".

Based on the syntax provided above in Table 8 and Table 9, in one example, a process for generating unavailable pictures may be performed according to and/or based the following steps:

For each RefPics[j][i], with i in the range of 0 to NumDeltaPocs[CurrRPListIdx[j]], inclusive, for j in the range 0 to num_rpl_slice_header_minus1, inclusive, that is equal to "no reference picture", a picture is generated as specified in "generation of one unavailable picture", and the following applies:

The value of PicOrderCntVal for the generated picture is set equal to PicOrderCntVal+DeltaPoc[CurrRPListIdx[j]][i].

The generated picture is marked as "used for short-term reference".

RefPics[j][i], is set to be the generated reference picture.

In an example the above steps may be performed for j equal to num_rpl_slice_header_minus1 only For each RefPics[j][i] for i in the range NumDeltaPocs [CurrRPListIdx[j]] to NumDeltaPocs[CurrRPListIdx [j]]+NumPocLt [CurrRPListIdx[j]]−1], inclusive, for j in the range 0 to num_rpl_slice_header_minus1, inclusive, that is equal to "no reference picture", a picture is generated as specified in "generation of one unavailable picture", and the following applies:

The value of PicOrderCntVal for the generated picture is set equal to (DPocLt[CurrRPListIdx[j]][i-NumDeltaPocs[CurrRPListIdx[j]]-slice_pic_order_cnt_lsb+PicOrderCntVal) if DeltaPocMsbPresentFlag[CurrRPListIdx[j]][i-NumDeltaPocs [CurrRPListIdx[j]]] is equal to 1 Or is set equal to DPocLt[CurrRPListIdx[j]][i-NumDeltaPocs[CurrRPListIdx[j]] otherwise (when DeltaPocMsbPresentFlag[CurrRPListIdx[j]][i-NumDeltaPocs[CurrRPListIdx[j]]] is equal to 0)

The value of slice_pic_order_cnt_lsb for the generated picture is inferred to be equal to ((PicOrderCntVal for the generated picture) & (MaxPicOrderCntLsb−1)).

The generated picture is marked as "used for long-term reference".

RefPics[j][i] is set to be the generated reference picture.

In an example the above steps may be performed for j equal to num_rpl_slice_header_minus1 only Based on the syntax provided above in Table 8 and Table 9, in one example, constructing the reference picture lists RefPicList0 and, for B slices, RefPicList1 may be as performed based on the following:

The variable NumRpsCurrList0 is set equal to Max (num_ref_idx_10_active_minus1+1, NumDeltaPocs [CurrRPListIdx[0]]+NumPocLt[CurrRPListIdx[0]]) and the list RefPicList0 is constructed as follows:

```
for(    i    =    0,    rIdx=0;    i    <
(NumDeltaPocs[ CurrRPListIdx[0] ] ]+NumPocLt[ CurrRPListIdx[0]])
&& rIdx < NumRpsCurrList0; rIdx++, i++ )
    RefPicList0[ rIdx ] = RefPics[ 0 ] [ i ]
```

When the slice is a B slice, the variable NumRpsCurrList1 is set equal to Max(num_ref_idx_11_active_minus1+1, NumDeltaPocs[CurrRPListIdx[0]]+NumPocLt[CurrRPListIdx[1]])) and the list RefPicList1 is constructed as follows:

```
for(    i    =    0,    rIdx=0;    i    <
(NumDeltaPocs[ CurrRPListIdx[1] ] ]+NumPocLt[ CurrRPListIdx[1]])
&& rIdx < NumRpsCurrList0; rIdx++, i++ )
    RefPicList0[ rIdx ] = RefPics[ 1 ] [ i ]
```

Table 10 illustrates another example of relevant syntax that may be included in an SPS and Table 11 illustrates an example of relevant syntax in slice segment header that may be used for signaling long-term reference picture lists directly according to the techniques herein. It should be noted that syntax included in Table 10 is not limited to being included in an SPS and syntax included in Table 11 is not limited to being included in a slice segment header. In the example illustrated with respect to Table 10 and Table 11, the long term reference picture related information is not included in the pic_list( ), but instead it is included in a separate long term ltrp_pic_list( ). It should be noted that when the long term reference picture related information is included in a separate ltrp_pic_list( ), pic_list( ) may be based on the example illustrated in Table 7.

TABLE 10

| | Descriptor |
|---|---|
| seq_parameter_set_rbsp( ) { | |
| ... | |
|   long_term_ref_pics_present_flag | u(1) |
|   num_ref_pic_lists_minus1 | ue(v) |
|   for( i = 1; i < num_ref_pic_lists_minus1+1; i++) | |
|     pic_list( i ) | |
|   if(long_term_ref_pics_present_flag) { | |
|     num_ltrp_ref_pic_lists_minus1 | ue(v) |
|     for( i = 0; i < num_ref_pic_lists_minus1+1; i++) | |
|       ltrp_pic_list( i ) | |
|   } | |
|   rbsp_trailing_bits( ) | |
| } | |

TABLE 11

| | Descriptor |
|---|---|
| slice_header( ) { | |
| ... | |
|   num_rpl_slice_header_minus1 | u(2) |
|   rpl_sps_flag | u(1) |
|   if( !rpl_sps_flag ) { | |
|     for( i = num_ref_pic_lists_minus1+1; i < num_ref_pic_lists_minus1+num_rpl_slice_header_minus1+2; i++) | |
|       pic_list(i) | |
|   } | |
|   else { | |
|     for( j = 0; j < num_rpl_slice_header_minus1+1; j++) | |
|       rpl_idx[j] | u(v) |
|   } | |
| if(long_term_ref_pics_present_flag) { | |
|   num_ltrp_rpl_slice_header_minus1 | u(2) |
|   ltrp_rpl_sps_flag | u(1) |
|   if( !ltrp_rpl_sps_flag ) { | |
|     for( i = num_ltrp_ref_pic_lists_minus1+1; i < num_ltrp_ref_pic_lists_minus1+num_ltrp_rpl_slice_header_minus1+2; i++) | |
|       ltrp_pic_list(i) | |
|   } | |
|   else { | |
|     for( j = 0; j < num_ltrp_rpl_slice_header_minus1+1; j++) | |
|       ltrp_rpl_idx[j] | u(v) |
|   } | |
| } | |
|   byte_alignment( ) | |
| } | |

In one example, the following definitions may be used for the respective syntax elements illustrated in Table 10.

long_term_ref_pics_present_flag equal to 0 specifies that no long-term reference picture is used for inter prediction of any coded picture in the CVS. long_term_ref_pics_present_flag equal to 1 specifies that long-term reference pictures may be used for inter prediction of one or more coded pictures in the CVS.

num_ref_pic_lists_minus1 specifies the number of pic_lists(i) syntax structures included in the SPS. The value of num_ref_pic_lists_minus1 shall be in the range of 0 to 255, inclusive.

pic_list(0) is inferred to be a null list of pictures. Thus pic_list(0) does not include any pictures.

A decoder should allocate memory for a total number of (num_ref_pic_lists_minus1+4) pic_list( ) syntax structures since there may be up to 3 pie list( ) syntax structure directly signalled in the slice headers of a current picture.

num_ltrp_ref_pic_lists_minus1 specifies the number of ltrp_pic_lists(i) syntax structures included in the SPS. The value of num_ltrp_ref_pic_lists_minus1 shall be in the range of 0 to 255, inclusive. A decoder should allocate memory for a total number of (num_ltrp_ref_pic_lists_minus1+3) ltrp_pic_list( ) syntax structures since there may be upto 2 ltrp_pic_list( ) syntax structure directly signalled in the slice headers of a current picture.

In one example, the following definitions may be used for the respective syntax elements illustrated in Table 11.

num_rpl_slice_header_minus1 specifies the number of pic_lists(i) syntax structures signaled directly in the slice header if rpl_sps_flag is equal to 0 or specifies the number of rpl_index[j] entries signaled in the slice header if rpl_sps_flag is equal to 1. The value of num_rpl_slice_header_minus1 shall be in the range of 0 to 2, inclusive. The value 3 is reserved.

rpl_sps_flag equal to 1 specifies that the reference picture list(s) for the current picture are signaled based on pic_list( ) syntax structures in the active SPS as identified by the syntax element(s) rpl_idx[j] in the slice header. rpl_sps_flag equal to 0 specifies that the the reference picture list(s) for the current picture are signaled in the pic_list( ) syntax structure(s) that are directly signaled in the slice headers of the current picture.

rpl_idx[j] specifies the indices for reference picture list(s). rpl_idx[0] specifies an index for the reference picture list 0 for the current picture. If present, rpl_idx[1] specifies an index for the reference picture list 1 if current slice is a B slice and specifies an index for the list of pictures which include reference pictures for pictures following the current picture in the bitstream order, if the current slice is a P slice. If present, rpl_idx[2] specifes an index for the list of pictures which include reference pictures for pictures following the current picture in the bitstream order.

The syntax element rpl_idx[j] for j in the range of 0 to num_rpl_slice_header_minus1 inclusive is represented by Ceil(Log 2(num_ref_pic_lists_minus1+1)) bits. The value of rpl_idx[j] shall be in the range of 0 to num_ref_pic_lists_minus1, inclusive.

num_ltrp_rpl_slice_header_Minusl specifies the number of ltrp_pic_lists(i) syntax structures signaled directly in the slice header if ltrp_rpl_sps_flag is equal to 0 or specifies the number of ltrp_rpl_index[j] entries signaled in the slice header if ltrp_rpl_sps_flag is equal to 1. The value of num_ltrp_rpl_slice_header_minus1 shall be in the range of 0 to 1, inclusive. The value 2 and 3 are reserved.

In another example, only 1 bit (i.e. u(1)) may be used for num_ltrp_rpl_slice_header_minus1 and its semantics will be as follows:

num_ltrp_rpl_slice_header_minus1 specifies the number of ltrp_pic_lists(i) syntax structures signaled directly in the slice header if ltrp_rpl_sps_flag is equal to 0 or specifies the number of ltrp_rpl_index[j] entries signaled in the slice header if ltrp_rpl_sps_flag is equal to 1.

ltrp_rpl_sps_flag equal to 1 specifies that the long-term reference picture list(s) for the current picture are signaled based on ltrp_pic_list( ) syntax structures in the active SPS as identified by the syntax element(s) ltrp_rpl_idx[j] in the slice header. ltrp_rpl_sps_flag equal to 0 specifies that the long-term reference picture list(s) for the current picture are signaled in the ltrp_pic_list( ) syntax structure(s) that are directly signaled in the slice headers of the current picture.

ltrp_rpl_idx[j] specifies the indices for long-term reference picture list(s). ltrp_rpl_idx[0] specifies an index for use in the construction of long-term reference picture list 0 and 1 for the current picture. If present, rpl_idx[1] specifies an index for the list of pictures which include long-term reference pictures for pictures following the current picture in the bitstream order.

The syntax element ltrp_rpl_idx[j] for j in the range of 0 to num_ltrp_rpl_slice_header_minus1 inclusive is represented by Ceil(Log 2(num_ltrp_ref_pic_lists_minus1+1)) bits. The value of ltrp_rpl_idx[j] shall be in the range of 0 to num_ltrp_ref_pic_lists_minus1, inclusive.

Table 12 illustrates another example of ltrp_pic_list syntax that may be used in conjunction with the example syntax illustrated in Table 10 and Table 11.

TABLE 12

| | Descriptor |
|---|---|
| ltrp_pic_list( ltrpListIdx ) { | |
|   num_long_term_pics_minus1 | ue(v) |
|   for( j = 0; j < num_long_term_pics_minus1+1; j++ ) { | |
|     poc_lsb_lt[ j ] | u(v) |
|     delta_poc_msb_present_flag[ j ] | u(1) |
|     if( delta_poc_msb_present_flag[ j ] ) | |
|       delta_poc_msb_cycle_lt[ j ] | ue(v) |
|   } | |
| } | |

In one example, the following definitions may be used for the respective syntax elements illustrated in Table 12.

num_long_term_pics_minus1 plus 1 specifies the number of long-term reference picture entries in the picture list. The sum of NumNegativePics[listIdx], NumPositivePics[listIdx], (num_long_term_pics_minus1+1) shall be less than or equal to sps_max_dec_pic_buffering_minus1[sps_max_sub_layers_minus1].

poc_lsb_lt[j] specifies the value of the picture order count modulo MaxPicOrderCntLsb of the j-th long-term reference picture in the list. The length of the poc_lsb_lt[i] syntax element is log 2_max_pic_order_cnt_lsb_minus4+4 bits.

delta_poc_msb_present_flag[j] equal to 1 specifies that delta_poc_msb_cycle_lt[j] is present. delta_poc_msb_present_flag[j] equal to 0 specifies that delta_poc_msb_cycle_lt[j] is not present.

delta_poc_msb_cycle_lt[j] is used to determine the value of the most significant bits of the picture order count value of the j-th long-term reference picture in the list. When delta_poc_msb_cycle_lt[j] is not present, it is inferred to be equal to 0.

The variable DeltaPocMsbCycleLt[j] is derived as follows:

```
if( j == 0 )
    DeltaPocMsbCycleLt[ j ] = delta_poc_msb_cycle_lt[ j ]
else
    DeltaPocMsbCycleLt[ j ] = delta_poc_msb_cycle_lt[ j ] +
    DeltaPocMsbCycleLt[ j - 1 ]
```

When inv_list_flag is equal to 0, the variables NumNegativePics[listIdx], NumPositivePics[listIdx], NumPositivePics[listIdx], DeltaPoc[listIdx][i] are derived as follows:
NumNegativePics[listIdx]=neg_delta_entries
NumPositivePics[listIdx]=pos_delta_entries
NumDeltaPocs[listIdx]=NumNegativePics[listIdx]+NumPositivePics[listIdx]
  If i is equal to 0, the following applies:
    DeltaPoc[listIdx][i]=−(delta_entries_minus1[0]+1)
  If i is >0 and less than neg_delta_entries, the following applies:
    DeltaPoc[listIdx][i]=DeltaPoc[listIdx][i−1]−(delta_entries_minus1 [i]+1)
  If i is equal to neg_delta_entries, the following applies:
    DeltaPoc[listIdx][neg_delta_entries]=delta_entries_minus1[i]+1
  If i is >neg_delta_entries, the following applies:
    DeltaPoc[listIdx][i]=DeltaPoc[listIdx][i−1]+(delta_entries_minus1[i]+1)

When inv_list_flag is equal to 1, the variables NumNegativePics[listIdx], NumPositivePics[listIdx], NumDeltaPocs[listIdx], DeltaPoc[listIdx][i] are derived as follows:
NumNegativePics[listIdx]=NumPositivePics[listIdx−1]
NumPositivePics[listIdx]=NumNegativePics[listIdx−1]
NumDeltaPocs[listIdx]=NumDeltaPocs[listIdx−1]
  For i in the range of 0 to NumDeltaPocs[listIdx], inclusive the following applies:

DeltaPoc[ listIdx ][ i ] = −(DeltaPoc[ listIdx-1 ][ i ] )
If long_term_ref_pics_present_flag is equal to 0 then NumPocLt[ ltrpListIdx ] is set equal to 0
Otherwise: NumPocLt[ ltrpListIdx ] = num_long_term_pics_minus1+1
for( j = 0; j < num_long_term_pics_minus1+1; j++ ) {

```
    DpocLt[ ltrpListIdx ][ j ] = poc_lsb_lt[ j ] -
(delta_poc_msb_present_flag[ j ] ? DeltaPocMsbCycleLt[ j ]*MaxPicOrderCntLsb : 0)
    DeltaPocMsbPresentFlag[ ltrpListIdx ][ j ] =
delta_poc_msb_present_flag[ j ]
}
```

Based on the syntax provided above in Table 10, Table 11 and Table 12, in one example, a process for deriving reference picture lists (RPL)s may be performed according to and/or based the following steps. The steps may be executed in sequence shown below or in a different order.

The Following Applies:
The variable CurrRPListIdx[j] for j in the range of 0 to num_rpl_slice_header_minus1, inclusive, is derived as follows:
   If rpl_sps_flag is equal to 1, CurrRPListIdx[j] is set equal to rpl_idx[j].
   Otherwise, CurrRPListIdx[j] is set equal to rpl_idx[num_ref_pic_lists_minus1+j+1].
The following applies for j in the range of 0 to num_rpl_slice_header_minus1, inclusive,

```
for( i = 0; i < NumDeltaPocs[ CurrRPListIdx[j] ]; i++ )
    if( there is a short-term reference picture picX in the DPB
        with PicOrderCntVal equal to (PicOrderCntVal +
    DeltaPoc[ CurrRPListIdx[j] ][ i ]) )
        RefPics[ j ][ i ] = picX
    else
        RefPics[ j ][ i ] = "no reference picture"
```

The following applies for j in the range of 0 to num_rpl_slice_header_minus1, inclusive, for n in the range of 0 to num_ltrp_rpl_slice_header_minus1, inclusive:
The variable CurrLTRPRPListIdx[n] for n in the range of 0 to num_ltrp_rpl_slice_header_minus1, inclusive, is derived as follows:

```
-If ltrp_rpl_sps_flag is equal to 1, CurrLTRPRPListIdx[n] is set equal to
ltrp_rpl_idx[n].
    -Otherwise, CurrLTRPRPListIdx[n] is set equal to
ltrp_rpl_idx[num_ltrp_ref_pic_lists_minus1+n+1].
for( m = 0; m< NumPocLt [CurrLTRPRPListIdx[n] ]; m++ )
    if(! DeltaPocMsbPresentFlag[CurrLTRPRPListIdx[n] ][ m ] )
        if( there is a reference picture picX in the DPB with
    slice_pic_order_ent_lsb equal to DPocLt[CurrLTRPRPListIdx[n] ][ m ] )
            RefPics[ j ][ NumDeltaPocs[ CurrRPListIdx[j] ]+m ] = picX
        else
            RefPics[ j ][ NumDeltaPocs[ CurrRPListIdx[j] ]+m ] = "no
reference picture"
    else
        if( there is a reference picture picX in the DPB with PicOrderCntVal
equal to (DPocLt[CurrLTRPRPListIdx [n] ][ m ]-slice_pic_order_cnt_lsb+
PicOrderCntVal))
            RefPics[ j ][ NumDeltaPocs[ CurrRPListIdx[j] ]+m ] = picX
        else
            RefPics[ j ][ NumDeltaPocs[ CurrRPListIdx[j] ]+m ]= "no
reference picture"
```

In another example the above steps
   only apply for j in the range of 0 to 1 if current slice is a B slice or for j in the range of 0 if current slice is a P slice for n equal to 0, and
   only apply for j equal to max(2, num_rpl_slice_header_minus1) if current slice is a B slice or for j equal to max(1, num_rpl_slice_header_minus1) if current slice is a P slice for n equal to max(1, num_ltrp_rpl_slice_header_minus1), and All reference pictures that are included in RefPics[j][k] for k in the range NumDeltaPocs[CurrRPListIdx[j]] to NumDeltaPocs[CurrRPListIdx[j]]+NumPocLt [CurrLTRPRPListIdx[n]]−1], inclusive, for j in the range of 0 to num_rpl_slice_header_minus1, inclusive, are marked as "used for long-term reference".

All reference pictures in the DPB that are not included in RefPics[j] for j in the range of 0 to num_rpl_slice_header_minus1, inclusive, are marked as "unused for reference".

Based on the syntax provided above in Table 10, Table 11 and Table 12, in one example, a process for generating unavailable pictures may be performed according to and/or based the following steps:

For each RefPics[j][i], with i in the range of 0 to NumDeltaPocs[CurrRPListIdx[j]], inclusive, for j in the range 0 to num_rpl_slice_header_minus1, inclusive, that is equal to "no reference picture", a picture is generated as specified in "generation of one unavailable picture", and the following applies:
   The value of PicOrderCntVal for the generated picture is set equal to PicOrderCntVal+DeltaPoc[CurrRPListIdx[j]] [i].
   The generated picture is marked as "used for short-term reference"
   RefPics[j][i], is set to be the generated reference picture.
   In an example the above steps may be performed for j equal to num_rpl_slice_header_minus1 only.

For each RefPics[j][i] for i in the range NumDeltaPocs [CurrRPListIdx[j]] to NumDeltaPocs[CurrRPListIdx[j]]+ NumPocLt [CurrLTRPRPListIdx[n]]−1], inclusive, for j in the range 0 to num_rpl_slice_header_minus1, inclusive, n in the range of 0 to num_ltrp_rpl_slice-header_minus1, that is equal to "no reference picture", a picture is generated as specified in "generation of one unavailable picture", and the following applies:
   The value of PicOrderCntVal for the generated picture is set equal to (DPocLt[CurrLTRPRPListIdx[n]][i-NumDeltaPocs[CurrRPListIdxij]]]-slice_pic_order_cnt_lsb+PicOrderCntVal) if DeltaPocMsbPresentFlag [CurrLTRPRPListIdx[n]][i-NumDeltaPocs [CurrRPListIdx[j]]] is equal to 1 Or is set equal to DPocLt[CurrLTRPRPListIdx[n]][i-NumDeltaPocs [CurrRPListIdx[j] ] otherwise (when DeltaPocMsbPresentFlag[CurrLTRPRPListIdx[n]][i-NumDeltaPocs [CurrRPListIdx[j]]] is equal to 0).
   The value of slice_pic_order_cnt_lsb for the generated picture is inferred to be equal to ((PicOrderCntVa1 for the generated picture) & (MaxPicOrderCntLsb−1)).
   The generated picture is marked as "used for long-term reference".
   RefPics[j][i] is set to be the generated reference picture.
   In an example the above steps may be performed for j equal to num_rpl_slice_header_minus1 only and for n equal to num_ltrp_rpl_slice_header_minus1.
   In an example the above steps may be performed for j equal to num_rpl_slice_header_minus1 only.

Based on the syntax provided above in in Table 10, Table 11 and Table 12, in one example, constructing the reference picture lists RefPicList0 and, for B slices, RefPicList1 may be as performed based on the following:

The variable NumRpsCurrList0 is set equal to Max (num_ref_idx_10_active_minus1+1, NumDeltaPocs[CurrRPListIdx[0]]+NumPocLt[CurrLTRPRPListIdx[0]]) and the list RefPicList0 is constructed as follows:

```
for( i = 0, rIdx=0; i <
(NumDeltaPocs[ CurrRPListIdx[0] ] ]+NumPocLt[ CurrRPListIdx[0]])
&& rIdx < NumRpsCurrList0; rIdx++, i++ )
    RefPicList0[ rIdx ] = RefPics[ 0 ][ i ]
```

When the slice is a B slice, the variable NumRpsCurrList1 is set equal to Max(num_ref_idx_11_active_minus1+1, NumDeltaPocs[CurrRPListIdx[0]]+NumPocLt[CurrLTR-PRPListIdx[0]])) and the list RefPicList1 is constructed as follows:

```
for( i = 0, rIdx=0; i <
(NumDeltaPocs[ CurrRPListIdx[1] ]+NumPocLt
[ CurrLTRPRPListIdx[0]]) && rIdx < NumRpsCurrList1; rIdx++, i++ )
    RefPicList1[ rIdx ] = RefPics[ 1 ][ i ]
```

In one example, a long-term reference picture list may be directly signaled in a slice header. With respect to the example of SPS syntax illustrated in Table 8, Table 13 illustrates an example of relevant syntax in slice segment header that may be used for signaling long-term reference picture lists directly according to the techniques herein. Further, Table 14 provides an example of a long-term reference picture that may be included in a slice segment header. It should be noted that the example long-term reference picture list illustrated in Table 14 is arranged such that first few entries (indicated by a syntax element or variable) in the list signal Long-term reference picture (LTRP) information for the current picture and the remaining entries in the list signal LTRP information for pictures following the current picture in the bitstream order.

TABLE 13

|  | Descriptor |
|---|---|
| slice_header( ) { |  |
| ... |  |
| num_rpl_slice_header_minus1 | u(2) |
| rpl_sps_flag | u(1) |
| if( !rpl_sps_flag ) { |  |
| for( i = num_ref_pic_lists_minus1+1; i < num_ref_pic_lists_minus1+num_rpl_slice_header_minus1+2; i++) |  |
| pic_list(i) |  |
| } |  |
| else { |  |
| for( j = 0; j < num_rpl_slice_header_minus1+1; j++) |  |
| rpl_idx[j] | u(v) |
| } |  |
| if(long_term_ref_pics_present_flag) { |  |
| ltrp_sl_list( ) |  |
| } |  |
| byte_alignment( ) |  |
| } |  |

TABLE 14

|  | Descriptor |
|---|---|
| ltrp_sl_list( ) { |  |
| num_long_term_pics_minus1 | ue(v) |
| num_currpic_long_term_pics | ue(v) |
| for( j = 0; j < num_long_term_pics_minus1+1; j++ ) { |  |
| poc_lsb_lt[ j ] | u(v) |
| delta_poc_msb_present_flag[ j ] | u(1) |
| if( delta_poc_msb_present_flag[ j ] ) |  |
| delta_poc_msb_cycle_lt[ j ] | ue(v) |
| } |  |
| } |  |

In one example, the following definitions may be used for the respective syntax elements illustrated in Table 13.

num_rpl_slice_header_minus1 specifies the number of pic_lists(i) syntax structures signaled directly in the slice header if rpl_sps_flag is equal to 0 or specifies the number of rpl_index[j] entries signaled in the slice header if rpl_sps_flag is equal to 1. The value of num_rpl_slice_header_minus1 shall be in the range of 0 to 2, inclusive. The value 3 is reserved.

rpl_sps_flag equal to 1 specifies that the reference picture list(s) for the current picture are signaled based on pic_list( ) syntax structures in the active SPS as identified by the syntax element(s) rpl_idx[j] in the slice header. rpl_sps_flag equal to 0 specifies that the the reference picture list(s) for the current picture are signaled in the pic_list( ) syntax structure(s) that are directly signaled in the slice headers of the current picture.

rpl_idx[j] specifies the indices for reference picture list(s). rpl_idx[0] specifies an index for the reference picture list 0 for the current picture. If present, rpl_idx[1] specifies an index for the reference picture list 1 if current slice is a B slice and specifies an index for the list of pictures which include reference pictures for pictures following the current picture in the bitstream order, if the current slice is a P slice. If present, rpl_idx[2] specifes an index for the list of pictures which include reference pictures for pictures following the current picture in the bitstream order.

The syntax element rpl_idx[j] for j in the range of 0 to num_rpl_slice_header_minus1 inclusive is represented by Ceil(Log 2(num_ref_pic_lists_minus1+1)) bits. The value of rpl_idx[j] shall be in the range of 0 to num_ref_pic_lists_minus1, inclusive.

In one example, the following definitions may be used for the respective syntax elements illustrated in Table 14.

num_long_term_pics_minus1 plus 1 specifies the number of long-term reference picture entries in this ltrp_sl_list( ) list. This includes information for long-term reference picture for the current picture and for pictures following the current picture in the bitstream order.

num_currpic_long_termpics specifies the number of long-term reference picture entries in this ltrp_sl_list( ) list for the current picture.

Thus in the for loop in ltrp_sl_list( ), first num_currpic_long_term_pics entries correspond to long-term reference picture information for the current picture and subsequent entries correspond to long-term reference picture information for pictures following the current picture in the bitstream order.

The sum of NumNegativePics[listIdx], NumPositivePics[listIdx], (num_long_termpics_minus1+1) shall be less than or equal to sps_max_dec_pic_buffering_minus1[sps_max_sub_layers_minus1].

poc_lsb_lt[j] specifies the value of the picture order count modulo MaxPicOrderCntLsb of the j-th long-term reference picture. The length of the poc_lsb_lt[i] syntax element is log 2_max_pic_order_cnt_lsb_minus4+4 bits.

delta_poc_msb_present_flag[j] equal to 1 specifies that delta_poc_msb_cycle_lt[j] is present. delta_poc_msb_present_flag[j] equal to 0 specifies that delta_poc_msb_cycle_lt[j] is not present.

delta_poc_msb_cycle_lt[j] is used to determine the value of the most significant bits of the picture order count value of the j-th long-term reference picture. When delta_poc_msb_cycle_lt[j] is not present, it is inferred to be equal to 0. The variable DeltaPocMsbCycleLt[j] is derived as follows:

```
if( j == 0 )
    DeltaPocMsbCycleLt[ j ] = delta_poc_msb_cycle_lt[ j ]
else
    DeltaPocMsbCycleLt[ j ] = delta_poc_msb_cycle_lt[ j ] +
    DeltaPocMsbCycleLt[ j − 1 ]
```

When inv_list_flag is equal to 0, the variables NumNegativePics[listIdx], NumPositivePics[listIdx], NumPositivePics[listIdx], DeltaPoc[listIdx][i] are derived as follows:
NumNegativePics[listIdx]=neg_delta_entries
NumPositivePics[listIdx]=pos_delta_entries
NumDeltaPocs[listIdx]=NumNegativePics[listIdx]+NumPositivePics[listIdx]
  If i is equal to 0, the following applies:
    DeltaPoc[listIdx][i]=−(delta_entries_minus1 [0]+1)
  If i is >0 and less than neg_delta_entries, the following applies:
    DeltaPoc[listIdx][i]=DeltaPoc[listIdx][i−1]−(delta_entries_minus1[i]+1)
  If i is equal to neg_delta_entries, the following applies:
    DeltaPoc[listIdx][neg_delta_entries]=delta_entries_minus[i]+1
  If i is >neg_delta_entries, the following applies:
    DeltaPoc[listIdx][i]=DeltaPoc[listIdx][i−1]+(delta_entries_minus1[i]+1)

When inv_list_flag is equal to 1, the variables NumNegativePics[listIdx], NumPositivePics[listIdx], NumDeltaPocs [listIdx], DeltaPoc[listIdx][i] are derived as follows:
NumNegativePics[listIdx]=NumPositivePics[listIdx−1]
NumPositivePics[listIdx]=NumNegativePics[listIdx−1]
NumDeltaPocs[listIdx]=NumDeltaPocs[listIdx−1]
  For i in the range of 0 to NumDeltaPocs[listIdx], inclusive the following applies:

```
DeltaPoc[ listIdx ][ i ] = −(DeltaPoc[ listIdx-1 ][ i ] )
If long_term_ref_pics_present_flag is equal to 0 NumPocLt is set equal
to 0
Otherwise: : NumPocLt = num_long_term_pics_minus1+1;
NumPocLtCurr = num_currpic_long_term_pics;
NumPocLtFoll=num_long_term_pics_minus1+1-NumPocLtCurr;
for( j = 0; j < num_long_term_pics_minus1+1; j++ ) {
    DpocLt[j] = poc_lsb_lt[ j ] - (delta_poc_msb_present_flag[ j ] ?
DeltaPocMsbCycleLt[ j ]*MaxPicOrderCntLsb : 0)
    DeltaPocMsbPresentFlag[ j ] = delta_poc_msb_present flag[ j ]
}
```

Based on the syntax provided above in Table 13 and Table 14, in one example, a process for deriving reference picture lists (RPL)s may be performed according to and/or based the following steps. The steps may be executed in sequence shown below or in a different order.

The Following Applies:

The variable CurrRPListfdx[j] for j in the range of 0 to num_rpl_slice_header_minus1, inclusive, is derived as follows:
  If rpl_sps_flag is equal to 1, CurrRPListIdx[j] is set equal to rpl_idx[j].
  Otherwise, CurrRPListIdx[j] is set equal to
rpl_idx[num_ref_pic_lists_minus1+j+1].

The following applies for j in the range of 0 to num_rpl_slice_header_minus1, inclusive,

```
for( i = 0; i < NumDeltaPocs[ CurrRPListIdx[j] ]; i++ )
    if( there is a short-term reference picture picX in the DPB
        with PicOrderCntVal equal to (PicOrderCntVal +
    DeltaPoc[ CurrRPListIdx[j] ][ i ]) )
        RefPics[ j ][ i ] = picX
    else
        RefPics[ j ][ i ] = "no reference picture"
``` for j in the range of in the range of 0 to 1 if current slice is a B slice or for j in the range of 0 if current slice is a P slice:

```
for( m = 0; m< NumPocLtCurr; m++ )
    if( ! DeltaPocMsbPresentFlag[ m ] )
        if( there is a reference picture picX in the DPB with
    slice_pic_order_cnt_lsb equal to DPocLt[ m ] )
            RefPics[ j ][ NumDeltaPocs[ CurrRPListIdx[j] ]+m ] = picX
        else
            RefPics[ j ][ NumDeltaPocs[ CurrRPListIdx[j] ]+m ] = "no
reference picture"
    else
        if( there is a reference picture picX in the DPB with PicOrderCntVal
equal to (DPocLt [ m ]-slice_pic_order_cnt_lsb+ PicOrderCntVal))
            RefPics[ j ][ NumDeltaPocs[ CurrRPListIdx[j] ]+m ] = picX
        else
            RefPics[ j ][ NumDeltaPocs[ CurrRPListIdx[j] ]+m ] = "no
reference picture"
```

And for j equal to max(2, num_rpl_slice_header_minus1) if current slice is a B slice or for j equal to max(1, num_rpl_slice_header_minus1) if current slice is a P slice

```
for( m = NumPocLtCurr; m< NumPocLt; m++ )
    if( ! DeltaPocMsbPresentFlag[ m ] )
        if( there is a reference picture picX in the DPB
with slice_pic_order_cnt_lsb equal to DPocLt[ m ] )
    RefPics[ j ][ NumDeltaPocs[ CurrRPListIdx[j] ]+m-NumPocLtCurr ] =
picX
        else
    RefPics[ j ][ NumDeltaPocs[ CurrRPListIdx[j] ]+m-NumPocLt-
Curr ]   =
"no reference picture"
    else
        if( there is a reference picture picX in the DPB with
PicOrderCntVal equal to (DPocLt [ m ]-slice_pic_order_cnt_lsb+
PicOrderentVal))
    RefPics[ j ][ NumDeltaPocs[ CurrRPListIdx[j] ]+m-NumPocLtCurr ] =
picX
        else
    RefPics[ j ][ NumDeltaPocs[ CurrRPListIdx[j] ]+m-NumPocLtCurr ]   =
"no reference picture"
```

All reference pictures that are included in RefPics[j][k] for k in the range NumDeltaPoces[CurrRPListIdx[j]] to NumDeltaPoces[CurrRPListIdx[j]]+NumPocLtCurr-1], inclusive, for j in the range of in the range of 0 to 1 if current slice is a B slice or for j in the range of 0 if current slice is a P slice and for k in the range NumDeltaPocs[CurrRPListIdxij]] to NumDeltaPocs[CurrRPListIdxij]]+NumPocLt-NumPocLtCurr-1], inclusive, for j equal to max(2, num_rpl_slice_header_minus1) if current slice is a B slice or for j equal to max(1, num_rpl_slice_header_minus1) if current slice is a P slice are marked as "used for long-term reference".

All reference pictures in the DPB that are not included in RefPics[j] for j in the range of 0 to num_rpl_slice_header_minus1, inclusive, are marked as "unused for reference".

Based on the syntax provided above in Table 13 and Table 14, in one example, a process for generating unavailable pictures may be performed according to and/or based the following steps:

For each RefPics[j][i], with i in the range of 0 to NumDeltaPocs[CurrRPListIdx[j]], inclusive, for j in the range 0 to num_rpl_slice_header_minus1, inclusive, that is equal to "no reference picture", a picture is generated as specified in "generation of one unavailable picture", and the following applies:

The value of PicOrderCntVal for the generated picture is set equal to PicOrderCntVal+DeltaPoc[CurrRPListIdx[j]][i].

The generated picture is marked as "used for short-term reference".

RefPics[j][i], is set to be the generated reference picture.

In an example the above steps may be performed for j equal to num_rpl_slice_header_minus1 only For each RefPics[j][i] for i in the range NumDeltaPocs[CurrRPListIdx[j]] to NumDeltaPocs[CurrRPListIdx[j]]+NumPocLtCurr]-1], inclusive, for j in the range of in the range of 0 to 1 if current slice is a B slice or for j in the range of 0 if current slice is a P slice, that is equal to "no reference picture", a picture is generated as specified in "generation of one unavailable picture", and the following applies:

The value of PicOrderCntVal for the generated picture is set equal to (DPocLt[i−NumDeltaPocs[CurrRPListIdx[j]]-slice_pic_order_cnt_lsb+PicOrderCntVal) if DeltaPocMsbPresentFlag [i−NumDeltaPocs[CurrRPListIdx[j]] is equal to 1 Or is set equal to DPocLt[i−NumDeltaPocs[CurrRPListIdx[ ]] otherwise (when DeltaPocMsbPresentFlag [i− NumDeltaPocs[CurrRPListIdx[j]] is equal to 0).

The value of slice_pic_order_cnt_lsb for the generated picture is inferred to be equal to ((PicOrderCntVal for the generated picture) & (MaxPicOrderCntLsb-1)).

The generated picture is marked as "used for long-term reference".

RefPics[j][i] is set to be the generated reference picture.

In an example the above steps may be performed for j equal to num_rpl_slice_header_minus1 only.

For each RefPics[j][i] for i in the range NumDeltaPocs[CurrRPListIdx[j]] to NumDeltaPocs[CurrRPListIdx[j]]+NumPocLt-NumPocLtCurr]-1], inclusive, for equal to max(2, num_rpl_slice_header_minus1) if current slice is a B slice or for j equal to max(1, num_rpl_slice_header_minus1) if current slice is a P slice, that is equal to "no reference picture", a picture is generated as specified in "generation of one unavailable picture", and the following applies:

The value of PicOrderCntVal for the generated picture is set equal to (DPocLt[i− NumDeltaPocs[CurrRPListIdx[j]]-slice_pic_order_cnt_lsb+PicOrderCntVal) if DeltaPocMsbPresentFlag [i-NumDeltaPocs[CurrRPListIdx[j]] is equal to 1 Or is set equal to DPocLt[i−NumDeltaPocs[CurrRPListIdx[j]] otherwise (when DeltaPocMsbPresentFlag [i− NumDeltaPocs[CurrRPListIdx[j]] is equal to 0).

The value of slice_pic_order_cnt_lsb for the generated picture is inferred to be equal to ((PicOrderCntVal for the generated picture) & (MaxPicOrderCntLsb-1)).

The generated picture is marked as "used for long-term reference".

RefPics[j][i] is set to be the generated reference picture.

In an example the above steps may be performed for j equal to num_rpl_slice_header_minus1 only.

Based on the syntax provided above in Table 13 and Table 14, in one example, constructing the reference picture lists RefPicList0 and, for B slices, RefPicList1 may be as performed based on the following:

The variable NumRpsCurrList0 is set equal to Max (num_ref_idx_l0_active_minus1+1, NumDeltaPocs[CurrRPListIdx[0]]+NumPocLtCurr) and the list RefPicList0 is constructed as follows:

```
for( i = 0, rIdx=0; i < (NumDeltaPocs[ CurrRPListIdx[0] ] ]+
    NumPocLtCurr)  &&   rIdx < NumRpsCurrList0; rIdx++, i++ )
        RefPicList0[ rIdx ] = RefPics[ 0 ][ i ]
```

When the slice is a B slice, the variable NumRpsCurrList1 is set equal to Max(num_ref_idx_l1_active_minus1+1, NumDeltaPocs[CurrRPListIdx[0]]+NumPocLtCurr)) and the list RefPicList1 is constructed as follows:

```
for( i = 0, rIdx=0; i < (NumDeltaPocs[ CurrRPListIdx[1] ]+
    NumPocLtCurr)  &&   rIdx < NumRpsCurrList1; rIdx++, i++ )
        RefPicList1[ rIdx ] = RefPics[ 1 ][ i ]
```

In one example, the long-term reference picture may be inserted in the reference picture list 0 and/or reference picture list 1 according to their PicOrderCntVal value distance compared to the PicOrderCntVal of the current picture.

It should be noted that with respect to the example illustrated in Tables 8-14, processes the generation of one unavailable picture and reference picture list selection may be similar to that described above with respect Tables 4-7.

As described above, a process for reference picture lists construction of RefPicList0 and RefPicList1 includes determining respective values for NumRpsCurrList0 and NumRpsCurrList1. As provided above, values for NumRpsCurrList0 and NumRpsCurrList1 are determined based on respective values of num_ref_idx_l0_active_minus1 and num_ref_idx_l1_active_minus1. In JVET-K1001 values of num_ref_idx_l0_active_minus1 and num_ref_idx_l1_active_minus1 may be determined based on the following syntax elements included in the picture parameter set (PPS).

num_ref_idx_l0_default_active_minus1 specifies the inferred value of num_ref_idx_l0_active_minus1 for P and B slices with num_ref_idx_active_override_flag equal to 0. The value of num_ref_idx_ l0_default_active_minus1 shall be in the range of 0 to 14, inclusive.

num_ref_idx_l1_default_active_minus1 specifies the inferred value of num_ref_idx_l1_active_minus1 with num_ref_idx_active_override_flag equal to 0. The value of num_ref_idx_l1_default_active_minus1 shall be in the range of 0 to 14, inclusive.

and the following syntax elements provided in the slice header:

num_ref_idx_active_overridejflag equal to 1 specifies that the syntax element num_ref_idx_l0_active_minus1 is present for P and B slices and that the syntax element num_ref_idx_l1_active_minus1 is present for B slices. num_ref_idx_active_override_flag equal to 0 specifies that the syntax elements num_ref_idx_l0_active_minus1 and num_ref_idx_l1_active_minus1 are not present.

num_ref_idx_l0_active_minus1 specifies the maximum reference index for reference picture list 0 that may be used to decode the slice. num_ref_idx_l0_active_minus1 shall be in the range of 0 to 14, inclusive. When the current slice is a P or B slice and num_ref_idx_l0_active_minus1 is not present, num_ref_idx_l0_active_minus1 is inferred to be equal to num_ref_idx_l0_default_active_minus1.

num_ref_idx_l1_active_minus1 specifies the maximum reference index for reference picture list 1 that may be used to decode the slice. num_ref_idx_l1_active_minus1 shall be in the range of 0 to 14, inclusive. When num_ref_idx_l1_active_minus1 is not present, num_ref_idx_l1_active_minus1 is inferred to be equal to num_ref_idx_l1_default_active_minus1.

According to the techniques herein, num_ref_idx_l0_default_active_minus1, and num_ref_idx_l1_default_active_minus1 may be removed from the PPS in JVET-K1001, and variations of the PPS including num_ref_idx_l0_default_active_minus1, and num_ref_idx_l1_default_active_minus1. num_ref_idx_active_override_flag, num_ref_idx_l0_active_minus1, and num_ref_idx_l1_active_minus1 may be removed from the slice header in JVET-K1001, and variations of the slice header including num_ref_idx_active_override_flag, num_ref_idx_l0_active_minus1, and num_ref_idx_l1_active_minus1. That is, according to the techniques herein values of num_ref_idx_l0_active_minus1, and num_ref_idx_l1_active_minus1 are derived instead of being signaled directly. Further, techniques for deriving values corresponding to num_ref_idx_l0_active_minus1 and num_ref_idx_l1_active_minus1 according to techniques herein are described below. It should be noted that the conventions in ITU-T H.265 and JVET-K1001 provide where signaled values in calculations include underscores and derived values, which are called variables, do not include underscores. Thus, in the equations below NumRefidxL0ActiveMinus is a derived variable, the value of which corresponds to the previously signalled value of num_ref_idx_l0_active_minus1 and NumRefIdxL1ActiveMinus is a derived variable, the value of which corresponds to the previously signalled value num_ref_idx_l1_active_minus1. It should be noted that when the techniques described herein are used to modify JVET-K1001 instances of num_ref_idx_l0_active_minus1 and num_ref_idx_l1_active_minus1 in JVET-K1001 are replaced with respective instances of NumRefIdxL0ActiveMinus and NumRefIdxL1ActiveMinus. For the sake of brevity, each respective replacement of num_ref_idx_l0_active_minus1 and num_ref_idx_l1_active_minus1 with NumRefIdxL0ActiveMinus and NumRefIdxL1ActiveMinus is not described in detail herein.

In one example, according to the techniques herein, NumRefIdxL0ActiveMinus and NumRefIdxL1ActiveMinus may be derived as follows:

```
If current slice is a P or B slice:
    NumRefIdxL0ActiveMinus  =  (rpl_sps_flag? NumDeltaPocs
[ rpl_idx[0]]  :
NumDeltaPocs[num_ref_pic_lists_minus1+1] )−1
If current slice is a B slice:
```

NumRefIdxL1ActiveMinus = (rpl_sps_flag? NumDeltaPocs[ rpl_idx[1] ] :
NumDeltaPocs[num_ref_pic_lists_minus1+2] )−1

Further, in one example, according to the techniques herein, num_ref_idx_l0_active_minus1 and num_ref_idx_l1_active_minus1 may be derived as follows:

```
If current slice is a P or B slice:
    NumRefIdxL0ActiveMinus        =        (rpl_sps_flag?
(NumDeltaPocs[     rpl_idx[0]]+NumPocLt[    rpl_idx[0]]     :
(NumDeltaPocs[num_ref_pic_lists_minus1+1]+
NumPocLt[num_ref_pic_lists_minus1+1] ))−1
If current slice is a B slice:
    NumRefIdxL1ActiveMinus        =        (rpl_sps_flag?
(NumDeltaPocs[     rpl_idx[1]]+NumPoc[     rpl_idx[0]])     :
(NumDeltaPocs[num_ref_pic_lists_minus1+2]+
NumPocLt[num_ref_pic_lists_minus1+2] )−1
```

It should be noted that in one example, in the equations above, the step of subtracting 1 to derive NumRefIdxL0ActiveMinus and NumRefIdxL1ActiveMinus may be omitted.

Additionally, in this case the reference picture list 0 and reference picture list 1 creation process will be modified as follows:

The list RefPicList0 is constructed as follows:

```
for(i = 0; i <
(NumDeltaPocs[ CurrRPListIdx[0] ] ]+NumPocLt[ CurrRPListIdx[0]]);
i++ )
    RefPicList0[ rIdx ] = RefPics[ 0 ][ i ]
```

When the slice is a B slice, the list RefPicList1 is constructed as follows:

for (i=0; i<(NumDeltaPocs[CurrRPListIdx[1]]+NumPocLt[CurrRPListIdx[1]]); i++) RefPicList1[rIdx]=RefPics[1][i]

In another example, additionally, in this case the reference picture list 0 and reference picture list 1 creation process will be modified as follows:

The list RefPicList0 is constructed as follows:

for (i=0; i<NumDeltaPocs[CurrRPListIdx[0]]; i++) RefPicList0[rIdx]=RefPics[0][i]

When the slice is a B slice, the list RefPicList1 is constructed as follows:

for (i=0; i<NumDeltaPocs[CurrRPListIdx[1]]; i++) RefPicList1[rIdx]=RefPics[1][i]

"On reference picture management for VVC," 12th Meeting of ISO/IEC JTC1/SC29/WG11 3-12 Oct. 2018, Macao, CN, document JVET-L0112-v3, which is referred to herein as JVET-L0112, describes a reference picture management approach based on direct signaling and derivation of reference picture lists 0 and 1. In particular, Table 15 illustrates the relevant syntax included in the SPS for the reference picture management approach described in JVET-L0112, Table 16 illustrates the relevant syntax included in the PPS for the reference picture management approach described in JVET-L0112, and Table 17 illustrates the relevant syntax included in the slice header for the reference picture management approach described in JVET-L0112.

TABLE 15

| | Descriptor |
|---|---|
| seq_parameter_set_rbsp( ) { | |
| ... | |
|   long_term_ref_pics_flag | u(1) |
|   if( long_term_ref_pics_flag ) | |
|     additional_lt_poc_lsb | ue(v) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j, long_term_ref_pics_flag ) | |
|   } | |
| ... | |
| } | |

TABLE 16

| | Descriptor |
|---|---|
| pic_parameter_set_rbsp( ) { | |
| ... | |
|   for( i = 0; i < 2; i++) | |
|     num_ref_idx_default_active_minus1[ i ] | ue(v) |
|   rpl1_idx_present_flag | u(1) |
| ... | |
|   rbsp_trailing_bits( ) | |
| } | |

TABLE 17

| | Descriptor |
|---|---|
| slice_header( ) { | |
| ... | |
|   if( nal_unit_type != IRAP_NUT ) { | |
|     slice_pic_order_cnt_lsb | u(v) |
|     for( i = 0; i < 2; i++ ) { | |
|       if( i == 0 || ( i == 1 && rpl1_idx_present_flag ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 ) | |
|           if( i == 0 || ( i == 1 && rpl1_idx_present_flag ) ) | |
|             ref_pic_list_idx[ i ] | u(v) |
|       } else | |
|         ref_pic_list_struct( i, num_ref_pic_lists_in_sps[ i ], long_term_ref_pics_flag ) | |
|     } | |
|     if( slice_type == P || slice_type == B ) { | |
|       num_ref_idx_active_override_flag | u(1) |
|       if( num_ref_idx_active_override_flag ) | |
|         for( i = 0; i < ( slice_type == B ? 2: 1 ); i++ ) | |
|           num_ref_idx_active_minus1[ i ] | ue(v) |
|     } | |
|   } | |
|   ... | |
| } | |

JVET-L0112 provides the following definitions for the respective syntax elements illustrated in Table 15:

long_term_ref_pics_flag equal to 0 specifies that no LTRP is used for inter prediction of any coded picture in the CVS. long_term_ref_pics_flag equal to 1 specifies that LTRPs may be used for inter prediction of one or more coded pictures in the CVS.

additional_ltpoc_sb specifies the value of the variable MaxLtPicOrderCntLsb that is used in the decoding process for reference picture lists as follows:
MaxLtPicOrderCntLsb=$2^{(\log 2\_max\_pic\_order\_cnt\_lsb\_minus4+4+additional\_lt\_poc\_lsb)}$ The value of additional_lt_poc_lsb shall be in the range of 0 to 32−log 2_max_pic_order_cnt_lsb_minus4−4, inclusive.

When not present, the value of additional_lt_poc_lsb is inferred to be equal to 0.

rpl1_same_as_rpl0_flag equal to 1 specifies that the syntax structures num_ref_pic_lists_in_sps[1] and ref_pic_list_struct(1, rplsIdx, ltrpFlag) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx, ltrpFlag) is inferred to be equal to the value of corresponding syntax element in ref_pic_list_struct(0, rplsIdx, ltrpFlag) for rplsIdx ranging from 0 to num_ref_pic_lists_in_sps[0]− 1.

num_ref_pic_lists_in_sps[i] specifies the number of the ref_pic_list_struct(listIdx, rplsIdx, ltrpFlag) syntax structures with listIdx equal to i included in the SPS. The value of num_ref_pic_lists_in_sps[i] shall be in the range of 0 to 64, inclusive.

NOTE 2—For each value of listIdx (equal to 0 or 1), a decoder should allocate memory for a total number of num_ref_pic_lists_in_sps[i]+1 ref_pic_list_struct (listIdx, rplsIdx, ltrpFlag) syntax structures since there may be one ref_pic_list_struct(listIdx, rplsIdx, ltrpFlag) syntax structure directly signalled in the slice headers of a current picture.

JVET-L0112 provides the following definitions for the respective syntax elements illustrated in Table 16:

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_Dresent_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_piclist_idx[1] may be present in slice headers.

JVET-L0112 provides the following definitions for the respective syntax elements illustrated in Table 17:

slice_pic_order_cnt_lsb specifies the picture order count modulo MaxPicOrderCntLsb for the current picture. The length of the slice_pic_order_cnt_lsb syntax element is log 2_maxpic_order_cnt_lsb_minus4+4 bits. The value of the slice_pic_order_cnt_lsb shall be in the range of 0 to MaxPicOrderCntLsb−1, inclusive. When slice_pic_order_cnt_lsb is not present, slice_pic_order_cnt_lsb is inferred to be equal to 0.

ref_pic_list_sps_flag[i] equal to 1 specifies that reference picture list i of the current picture is derived based on one of the ref_pic_list_struct(listIdx, rplsIdx, ltrpFlag) syntax structures with listIdx equal to i in the active SPS. ref_pic_list_sps_flag[i] equal to 0 specifies that reference picture list i of the current picture is derived based on the ref_pic_list_struct(listIdx, rplsIdx, ltrpFlag) syntax structure with listIdx equal to i that is directly included in the slice headers of the current picture. When num_ref_pic_lists_in_sps[i] is equal to 0, the value of ref_pic_list_sps_flag[i] shall be equal to 0. When rpl_idx_present_flag is equal to 0 and ref_pic_list_sps_flag[0] is present, the value of ref_pic_list_sps_flag[1] is inferred to be equal to ref_pic_ist_sps_flag[0].

ref_pic_list_idx[i] specifies the index, into the list of the ref_pic_list_struct(listIdx, rplsIdx, ltrpFlag) syntax structures with listIdx equal to i included in the active SPS, of the ref_pic_list_struct(listIdx, rplsIdx, ltrpFlag) syntax structure with listIdx equal to i that is used for derivation of reference picture list i of the current picture. The syntax element ref_pic_list_idx[i] is represented by Ceil(Log 2(num_ref_pic_lists_in_sps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. When rpl_idx_present_flag is equal to 0 and ref_pic_list_sps_flag[0] is present, the value of ref_pic_list_idx[1] is inferred to be equal to ref_pic_list_idx[0].

num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present.

num_ref_idx_active_minus1[i], when present, specifies the value of the variable NumRefIdxActive[i] as follows:

NumRefIdxActive[$i$]=num_ref_idx_active_minus1[$i$]+1

The value of num_ref_idx_active_minus1[i] shall be in the range of 0 to 14, inclusive.

The value of NumRefIdxActive[i]− 1 specifies the maximum reference index for reference picture list i that may be used to decode the slice. When the value of NumRefIdxActive[i] is equal to 0, no reference index for reference picture list i may be used to decode the slice.

For i equal to 0 or 1, when the current slice is a B slice and num_ref_idx_active_override_flag is equal to 0, NumRefIdxActive[i] is inferred to be equal to num_ref_idx_default_active_minus1[i]+1.

When the current slice is a P slice and num_ref_idx_active_override_flag is equal to 0, NumRefIdxActive[0] is inferred to be equal to num_ref_idx_default_active_minus1[0]+1.

When the current slice is a P slice, NumRefIdxActive[1] is inferred to be equal to 0. When the current slice is an I slice, both NumRefIdxActive[0] and NumRefIdxActive[1] are inferred to be equal to 0.

In one example, according to the techniques herein, the slice header in JVET-L0112 may be modified to such that when the syntax elements corresponding to the number of active reference pictures are needed to be signaled, they are only signaled when the corresponding reference picture list includes more than one entry. In this case, when not signaled the number of active reference pictures for reference picture list 0 and/or reference picture list 1 are inferred. This provides bit savings.

In particular, Table 18 illustrates an example of the relevant syntax included in the slice header according to the techniques herein.

TABLE 18

| | Descriptor |
|---|---|
| slice_header( ) { | |
| ... | |
|   if( nal_unit_type != IRAP_NUT ) { | |
|     slice_pic_order_cnt_lsb | u(v) |
|     for( i = 0; i < 2; i++ ) { | |
|       if( i = = 0 \|\| ( i = = 1 && rpl1_idx_present_flag ) ) | |
|         ref_pic_list_sps_flag[ i ] | u(1) |

TABLE 18-continued

| | Descriptor |
|---|---|
|       if( ref_pic_list_sps_flag[ i ] ) { | |
|         if( num_ref_pic_lists_in_sps[ i ] > 1 ) | |
|           if( i = = 0 \|\| ( i = = 1 && rpl1_idx_present_flag ) ) | |
|             ref_pic_list_idx[ i ] | u(v) |
|       } else | |
|         ref_pic_list_struct( i, num_ref_pic_lists_in_sps[ i ], long_term_ref_pics_flag ) | |
|     } | |
|     if( slice_type = = P \|\| slice_type = = B ) { | |
|       num_ref_idx_active_override_flag | u(1) |
|       if( num_ref_idx_active_override_flag ) | |
|         for( i = 0; i < ( slice_type = = B ? 2: 1 ); i++ ) | |
|           if( ref_pic_list_sps_flag[ i ] ) | |
|             currRplsIdx[ i ] = ref_pic_list_idx[ i ] | |
|           else | |
|             currRplsIdx[ i ] = num_ref_pic_lists_in_sps[ i ] | |
|           if(NumEntriesInList[ i ][ currRplsIdx[i] ]>1) | |
|             num_ref_idx_active_minus1[ i ] | ue(v) |
|     } | |
|   } | |
| ... | |
| } | |

With respect to the respective syntax elements illustrated in Table 18, the definitions may be based on the definitions provided above. With respect to the syntax element num_ref_idx_active_minus1 the definition may be based on the following:

num_ref_idx_active_minus1[i], when present, specifies the value of the variable NumRefIdxActive[i] as follows:

NumRefIdxActive[$i$]=num_ref_idx_active_minus1[$i$]+1

The value of num_ref_idx_active_minus1[i] shall be in the range of 0 to 14, inclusive.

The value of NumRefIdxActive[i]− 1 specifies the maximum reference index for reference picture list i that may be used to decode the slice. When the value of NumRefIdxActive[i] is equal to 0, no reference index for reference picture list i may be used to decode the slice.

For i equal to 0 or 1, when the current slice is a B slice and num_ref_idx_active_override_flag is equal to 0, NumRefIdxActive[i] is inferred to be equal to num_ref_idx_default_active_minus1[i]+1.

When the current slice is a P slice and num_ref_idx_active_override_flag is equal to 0, NumRefIdxActive[0] is inferred to be equal to num_ref_idx_default_active_minus1[0]+1.

For i equal to 0 or 1, when the current slice is a B slice and num_ref_idx_active_override_flag is equal to 1, and num_ref_idx_active_minus1[i] is not present, num_ref_idx_active_minus1[i] is inferred to be equal to 0. In another example a different value may be inferred for num_ref_idx_active_minus1[i] for I equal to 0 and 1.

When the current slice is a P slice and num_ref_idx_active_override_flag is equal to 1, num_ref_idx_active_minus1[0] is not present, num_ref_idx_active_minus1[0] is inferred to be equal to 0. In another example, a different value may be inferred for num_ref_idx_active_minus1[0].

When the current slice is a P slice, NumRefIdxActive[1] is inferred to be equal to 0.

When the current slice is an I slice, both NumRefIdxActive[0] and NumRefIdxActive[1] are inferred to be equal to 0.

Further, in one example, according to the techniques herein, in Tables 17 num_ref_idx_active_minus1[i] may be instead be signaled as num_ref_idx_active[i], to allow a reference picture list to have no active reference pictures for a current picture. This may be the case when that reference picture list only includes pictures which are reference pictures for future pictures in the bitstream. Another case where a reference picture list may be empty may be when numustrp_entries[listIdx][rplsIdx] and num_ltrp_entries[listIdx][rplsIdx] are signaled in ref_pic_list_struct(listIdx, rplsIdx, ltrpFlag) such that the value of NumEntriesInList[listIdx][rplsIdx] shall be in the range of 0 to sps_max_dec_pic_buffering_minus1. In one example, num_ref_idx_active [i] may be based on the following definition:

num_ref_idx_active [i], when present, specifies the value of the variable NumRefIdxActive[i] as follows:

NumRefIdxActive[$i$]=num_ref_idx_active [$i$]

The value of num_ref_idx_active [i] shall be in the range of 0 to 15, inclusive.

When num_ref_idx_active[i] is greater than 0, the value of NumRefIdxActive[i] specifies the maximum reference index for reference picture list i that may be used to decode the slice. When the value of NumRefIdxActive[i] is equal to 0, no reference index for reference picture list i may be used to decode the slice.

For i equal to 0 or 1, when the current slice is a B slice and num_ref_idx_active_override_flag is equal to 0, NumRefIdxActive[i] is inferred to be equal to num_ref_idx_default_active_minus1[i]+1.

When the current slice is a P slice and num_ref_idx_active_override_flag is equal to 0, NumRefIdxActive[0] is inferred to be equal to num_ref_idx_default_active_minus1[0]+1.

When the current slice is a P slice, NumRefIdxActive[1] is inferred to be equal to 0.

When the current slice is an I slice, both NumRefIdxActive[0] and NumRefIdxActive[1] are inferred to be equal to 0.

Further, in one example, according to the techniques herein, in Table 18 may be modified and signaled as in Table 18A. In this case, num_ref_idx_active_minus1[i] may be instead be signaled as num_ref_idx_active[i] to allow a reference picture list to have no active reference pictures for a current picture. This may be the case when that reference picture list only includes pictures which are reference pictures for future pictures in the bitstream. Another case where a reference picture list may be empty may be when num_strp_entries[listIdx][rplsIdx] and num_ltrp_entries[listIdx][rplsIdx] are signaled in ref_pic_list_struct(listIdx, rplsIdx, ltrpFlag) such that the value of NumEntriesInList[listIdx]I[rplsIdx] shall be in the range of 0 to sps_max_dec_pic_buffering_minus1. In one example, num_ref_idx_active[i] may be based on the following definition. Additionally, in this case when the syntax elements corresponding to the number of active reference pictures are needed to be signaled, they are only signaled when the corresponding reference picture list is not empty. In this case, when not signaled the number of active reference pictures for reference picture list 0 and/or reference picture list 1 are inferred. This provides bit savings.

TABLE 18A

| | Descriptor |
|---|---|
| slice_header( ) { | |
|   slice_pic_parameter_set_id | ue(v) |
|   slice_address | u(v) |
|   slice_type | ue(v) |
|   if( nal_unit_type != IRAP_NUT ) { | |
|     slice_pic_order_cnt_lsb | u(v) |
|     for( i = 0; i < 2; i++ ) { | |
|       if( i = = 0 || ( i = = 1 && rpl1_idx_present_flag ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 ) | |

TABLE 18A-continued

| | Descriptor |
|---|---|
|         if( i = = 0 || ( i = = 1 && rpl1_idx_present_flag ) ) | |
|           ref_pic_list_idx[ i ] | u(v) |
|       } else | |
|         ref_pic_list_struct( i, num_ref_pic_lists_in_sps[ i ], long_term_ref_pics_flag ) | |
|     } | |
|     if( slice_type = = P || slice_type = = B ) { | |
|       num_ref_idx_active_override_flag | u(1) |
|       if( num_ref_idx_active_override_flag ) | |
|         for( i = 0; i < ( slice_type = = B ? 2: 1 ); i++ ) { | |
|           if( ref_pic_list_sps_flag[ i ] ) | |
|             currRplsIdx[ i ] = ref_pic_list_idx[ i ] | |
|           else | |
|             currRplsIdx[ i ] = num_ref_pic_lists_in_sps[ i ] | |
|           if(NumEntriesInList[ i ][ currRplsIdx[i] ]>0) | |
|             num_ref_idx_active [ i ] | ue(v) |
|         } | |
|     } | |
|   } | |
| ... | |
| } | |

In this case the semantics may be as follows:

num_ref_idx_active[i], when present, specifies the value of the variable NumRefIdxActive[i] as follows:

NumRefIdxActive[$i$]=num_ref_idx_active[$i$]

The value of num_ref_idx_active[i] shall be in the range of 0 to 15, inclusive.

When num_ref_idx_active[i] is greater than 0, the value of NumRefIdxActive[i] specifies the maximum reference index for reference picture list i that may be used to decode the slice. When the value of NumRefIdxActive[i] is equal to 0, no reference index for reference picture list i may be used to decode the slice.

For i equal to 0 or 1, when the current slice is a B slice and num_ref_idx_active_override_flag is equal to 0, NumRefIdxActive[i] is inferred to be equal to num_ref_idx_default_active_minus1[i]+1.

When the current slice is a P slice and num_ref_idx_active_override_flag is equal to 0, NumRefIdxActive[0] is inferred to be equal to num_ref_idx_default_active_minus1[0]+1.

For i equal to 0 or 1, when the current slice is a B slice and num_ref_idx_active_override_flag is equal to 1, and num_ref_idx_active[i] is not present, num_ref_idx_active[i] is inferred to be equal to 0.

When the current slice is a P slice and num_ref_idx_active_override_flag is equal to 1, num_ref_idx_active[0] is not present, num_ref_idx_active[0] is inferred to be equal to 0.

When the current slice is a P slice, NumRefIdxActive[1] is inferred to be equal to 0.

When the current slice is an I slice, both NumRefIdxActive[0] and NumRefIdxActive[1] are inferred to be equal to 0.

In another example, the constraint on NumEntriesInList[listIdx][rplsIdx]=num_strp_entries[listIdx][rplsIdx]+num_ltrp_entries[listIdx][rplsIdx] may be modified as follows:

The value of NumEntriesInList[listIdx][rplsIdx] shall be in the range of 01 to sps_max_dec_pic_buffering_minus1, inclusive.

Referring to Table 5 above, in one example, according to the techniques herein, in one example, the active override syntax may be included in the slice header according to the example illustrated in Table 19.

TABLE 19

|  | Descriptor |
|---|---|
| slice_header( ) { | |
| ... | |
|    num_rpl_slice_header_minus1 | u(2) |
|    rpl_sps_flag | u(1) |
|    if( !rpl_sps_flag ) { | |
|      for( i = num_ref_pic_lists_minus1+1; i < num_ref_pic_lists_minus1+num_rpl_slice_header_minus1+2; i++) | |
|        pic_list(i) | |
|    } | |
|    else { | |
|      for( j = 0; j < num_rpl_slice_header_minus1+1; j++) | |
|        rpl_index[j] | u(v) |
|    } | |
|    if( slice_type = = P \|\| slice_type = = B ) { | |
|      num_ref_idx_active_override_flag | u(1) |
|      if( num_ref_idx_active_override_flag ) { | |
|        if(NumDeltaPocs[ CurrRPListIdx[0] ]>1) | |
|          num_ref_idx_l0_active_minus1 | ue(v) |
|        if( (slice_type = = B) && (NumDeltaPocs[ CurrRPListIdx[1] ]>1) ) | |
|          num_ref_idx_l1_active_minus1 | ue(v) |
|      } | |
| ... | |
|    byte_alignment( ) | |
| } | |

With respect to the respective syntax elements illustrated in Table 19, the definitions may be based on the definitions provided above. With respect to the syntax element num_ref_idx_active_minus1 the definition may be based on the following:

num_ref_idx_l0_active_minus1 specifies the maximum reference index for reference picture list 0 that may be used to decode the slice. num_ref_idx_l0_ active_minus1 shall be in the range of 0 to 14, inclusive. When the current slice is a P or B slice and num_ref_idx_active_override_flag is equal to 0, num_ref_idx_l0_active_minus1 is inferred to be equal to num_ref_idx_l0_default_active_minus1.

When the current slice is a P or B slice and num_ref_idx_active_override_flag is equal to 1 and num_ref_idx_l0_active_minus1 is not present, num_ref_idx_l0_ active_minus1 is inferred to be equal to 0.

num_ref_idx_l1_active_minus1 specifies the maximum reference index for reference picture list 1 that may be used to decode the slice. num_ref_idx_l1_ active_minus1 shall be in the range of 0 to 14, inclusive. When num_ref_idx_l1_active_minus1 is not present and num_ref_idx_active_override_flag is equal to 0, num_ref_idx_l1_active_minus1 is inferred to be equal to num_ref_idx_l1_default_active_minus1.

When num_ref_idx_l1_active_minus1 is not present and num_ref_idx_active_override_flag is equal to 1, num_ref_idx_l1_active_minus1 is inferred to be equal to 0.

With respect to Table 19, the following part of the syntax

|  |  |
|---|---|
| if( (slice_type = = B) && (NumDeltaPocs[ CurrRPListIdx[1] ]>1) ) | |
|    num_ref_idx_l1_active_minus1 | ue(v) | may instead be written equivalently as:

|  |  |
|---|---|
| if( (slice_type = = B) ) { | |
|    if(NumDeltaPocs[ CurrRPListIdx[1] ]>1) | |
|      num_ref_idx_l1_active_minus1 | ue(v) |
| } | |

Table 20 illustrates the relevant syntax for reference picture list structure included for the reference picture management approach described in JVET-L0112.

TABLE 20

|  | Descriptor |
|---|---|
| ref_pic_list_struct( listIdx, rplsIdx, ltrpFlag ) { | |
|    num_strp_entries[ listIdx ][ rplsIdx ] | ue(v) |
|    if( ltrpFlag) | |
|      num_ltrp_entries[ listIdx ][ rplsIdx ] | ue(v) |
|    for( i = 0; i < NumEntriesInList[ listIdx ][ rplsIdx ]; i++) { | |
|      if( num_ltrp_entries[ listIdx ][ rplsIdx ] > 0 ) | |
|        lt_ref_pic_flag[ listIdx ][ rplsIdx ][ i ] | |
|      if( !lt_ref_pic_flag[ listIdx ][ rplsIdx ][ i ] ) { | |
|        strp_entry_sign_flag[ listIdx ][ rplsIdx ][ i ] | u(1) |
|        delta_poc_st[ listIdx ][ rplsIdx ][ i ] | ue(v) |
|      } else | |
|        poc_lsb_lt[ listIdx ][ rplsIdx ][ i ] | u(v) |
|    } | |
| } | |

JVET-L0112 provides the following definitions for the respective syntax elements illustrated in Table 20:

The ref_pic_list_struct(listIdx, rplsIdx, ltrpFlag) syntax structure may be present in an SPS or in a slice header. Depending on whether the syntax structure is included in a slice header or an SPS, the following applies:

If present in a slice header, the ref_pic_list_struct(listIdx, rplsIdx, ltrpFlag) syntax structure specifies reference picture list listIdx of the current picture (the picture containing the slice).

Otherwise (present in an SPS), the ref_pic_list_struct (listIdx, rplsIdx, ltrpFlag) syntax structure specifies a candidate for reference picture list listIdx, and the term "the current picture" in the semantics specified in the remainder of this clause refers to each picture that 1) has one or more slices containing ref_pic_list_idx [listIdx] equal to an index into the list of the ref_pic_list_struct(listIdx, rplsIdx, ltrpFlag) syntax structures included in the SPS, and 2) is in a CVS that has the SPS as the active SPS.

num_strp_entries[listIdx][rplsIdx] specifies the number of STRP entries in the ref_pic_list_struct(listIdx, rplsIdx, ltrpFlag) syntax structure.

num_ltrp_entries[listIdx][rplsIdx] specifies the number of LTRP entries in the ref_pic_list_struct(listIdx, rplsIdx, ltrpFlag) syntax structure. When not present, the value of num_ltrp_entries[listIdx][rplsIdx] is inferred to be equal to 0.

The variable NumEntriesInList[listIdx][rplsIdx] is derived as follows:

NumEntriesInList[listIdx][rplsIdx]=num_strp_entries [listIdx][rplsIdx]+num_ltrp_entries[listIdx][rplsIdx]

The value of NumEntriesInList[listIdx][rplsIdx] shall be in the range of 0 to sps_max_dec_pic_buffering_minus1, inclusive.

lt_ref_pic_flag[listIdx][rplsIdx][i] equal to 1 specifies that the i-th entry in the ref_pic_list_struct(listIdx, rplsIdx, ltrpFlag) syntax structure is an LTRP entry. lt_ref_pic_flag[listIdx][rplsIdx][i] equal to 0 specifies that the i-th entry in the ref_pic_list_struct(listIdx, rplsIdx, ltrpFlag) syntax structure is an STRP entry. When not present, the value of lt_ref_pic_flag[listIdx][rplsIdx][i] is inferred to be equal to 0.

It is a requirement of bitstream conformance that the sum of lt_ref_pic_flag[listIdx][rplsIdx][i] for all values of i in the range of 0 to NumEntriesInList[listIdx][rplsIdx]−1, inclusive, shall be equal to num_ltrp_entries[listIdx][rplsIdx].

strp_entry_sign_flag[listIdx][rplsIdx][i] equal to 1 specifies that i-th entry in the syntax structure ref_pic_list_struct(listIdx, rplsIdx, ltrpFlag) has a value greater than or equal to 0. strp_entry_sign_flag[listIdx][rplsIdx] equal to 0 specifies that the i-th entry in the syntax structure ref_pic_list_struct(listIdx, rplsIdx, ltrpFlag) has a value less than 0.

delta_poc_st[listIdx][rplsIdx][i], when the i-th entry is the first STRP entry in ref_pic_list_struct(rplsIdx, ltrpFlag) syntax structure, specifies the absolute difference between the picture order count values of the current picture and the picture referred to by the i-th entry, or, when the i-th entry is an STRP entry but not the first STRP entry in the ref_pic_list_struct(rplsIdx, ltrpFlag) syntax structure, specifies the absolute difference between the picture order count values of the pictures referred to by the i-th entry and by the previous STRP entry in the ref_pic_list_struct(listIdx, rplsIdx, ltrpFlag) syntax structure.

The value of delta_poc_st[listIdx][rplsIdx][i] shall be in the range of $-2^{15}$ to $2^{15}-1$ inclusive.

The list DeltaPocSt[listIdx][rplsIdx] is derived as follows:

```
for( i = 0; i < NumEntriesInList[ listIdx ][ rplsIdx ]; i++) {
    if( !lt_ref_pic_flag[ i ][ RplsIdx[ i ] ][ j ]) {
        DeltaPocSt[ listIdx ][ rplsIdx ][ i ] =
        ( strp_entry_sign_flag[ listIdx ][ rplsIdx ][ i ]) ?
            delta_poc_st[ listIdx ][ rplsIdx ][ i ] : 0 −
        delta_poc_st[ listIdx ][ rplsIdx ][ i ]
    }
}
``` poc_lsb_lt[listIdx][rplsIdx][i] specifies the value of the picture order count modulo MaxLtPicOrderCntLsb of the picture referred to by the i-th entry in the ref_pic_list_struct(listIdx, rplsIdx, ltrpFlag) syntax structure. The length of the poc_lsb_lt[listIdx][rplsIdx][i] syntax element is Log 2(MaxLtPicOrderCntLsb) bits.

In one example, according to the techniques herein, the relevant syntax for a reference picture list structure may be modified as shown in Table 21, such that the syntax element for number of short term reference picture entries is modified to be signaled with a minus1 coding. This provides bit savings and requires that at least one short term reference picture is signaled.

TABLE 21

|  | Descriptor |
|---|---|
| ref_pic_list_struct( listIdx, rplsIdx, ltrpFlag ) { | |
|   num_strp_entries_minus1[ listIdx ][ rplsIdx ] | ue(v) |
|   if( ltrpFlag ) | |
|     num_ltrp_entries[ listIdx ][ rplsIdx ] | ue(v) |
|   for( i = 0; i < NumEntriesInList[ listIdx ][ rplsIdx ]; i++) { | |
|     if( num_ltrp_entries[ listIdx ][ rplsIdx ] > 0 ) | |
|       lt_ref_pic_flag[ listIdx ][ rplsIdx ][ i ] | |
|     if( !lt_ref_pic_flag[ listIdx ][ rplsIdx ][ i ] ) { | |
|       strp_entry_sign_flag[ listIdx ][ rplsIdx ][ i ] | u(1) |
|       delta_poc_st[ listIdx ][ rplsIdx ][ i ] | ue(v) |
|     } else | |
|       poc_lsb_lt[ listIdx ][ rplsIdx ][ i ] | u(v) |
|   } | |
| } | |

In this case, the semantics for num_strp_entries_minus1 in Table 21 may as follows:

num_strp_entries_minus1[listIdx][rplsIdx] plus 1 specifies the number of STRP entries in the ref_pic_list_struct(listIdx, rplsIdx, ltrpFlag) syntax structure.

In this case, the variable NumEntriesInList[listIdx][rplsIdx] may be derived as follows:

NumEntriesInList[listIdx][rplsIdx]=num_strp_entries_minus1[listIdx][rplsIdx]+1+num_ltrp_entries[listIdx][rplsIdx]

In another example, this constraint may be as follows:

The value of NumEntriesInList[listIdx][rplsIdx] shall be in the range of 1 to sps_max_dec_pic_buffering_minus1, inclusive.

OR as follows:

The value of NumEntriesInList[listIdx][rplsIdx] shall be greater than 0.

In this manner, source device 102 represents an example of a device configured to signal one or more candidate reference picture lists in a parameter set, and signal an index to one of the candidate reference picture lists in a header associated with a region of a picture.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device.

For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
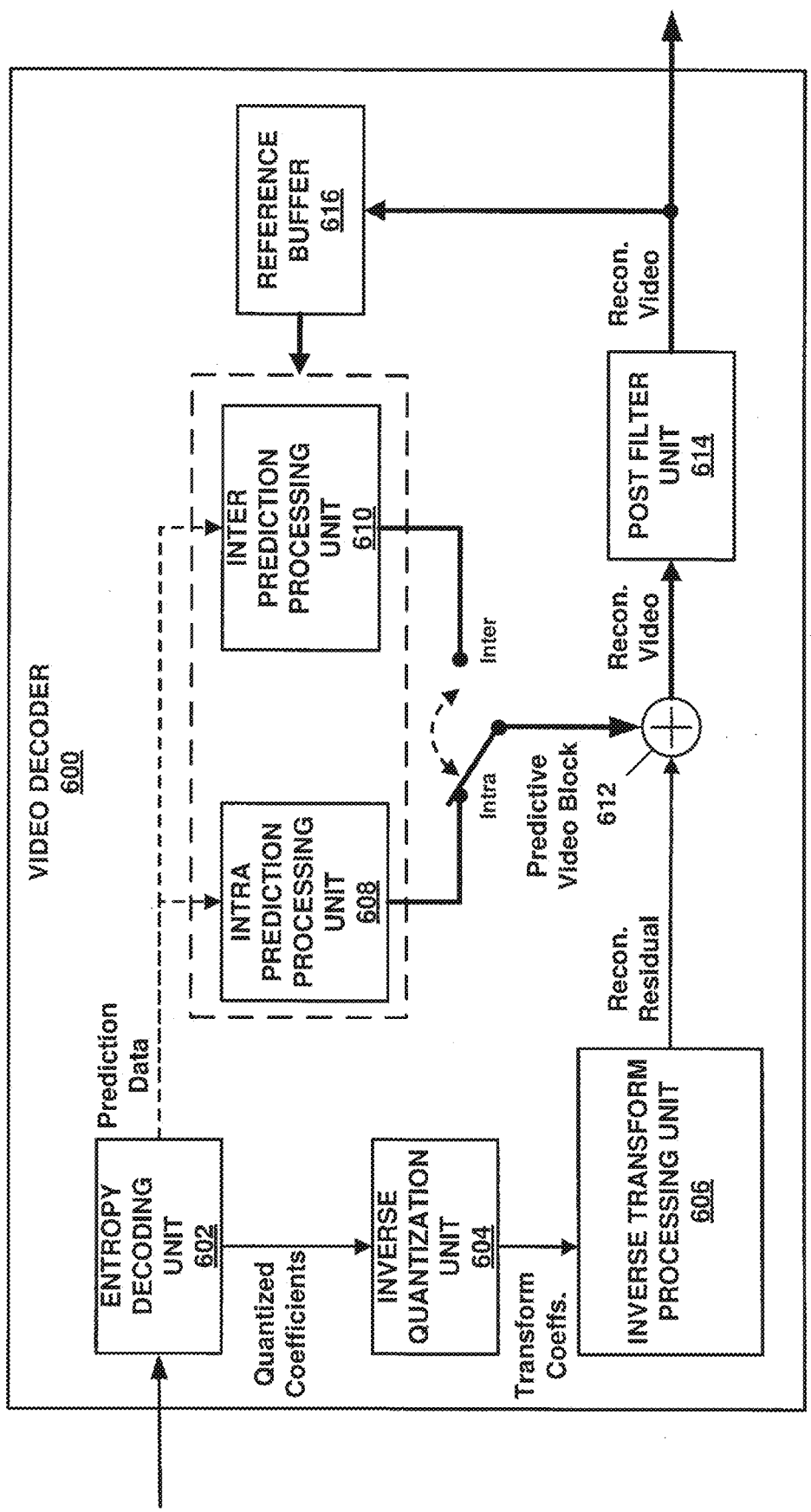
FIG. 6 is a block diagram illustrating an example of a video decoder that may be configured to decode video data according to one or more techniques of this disclosure.
Figure 7:
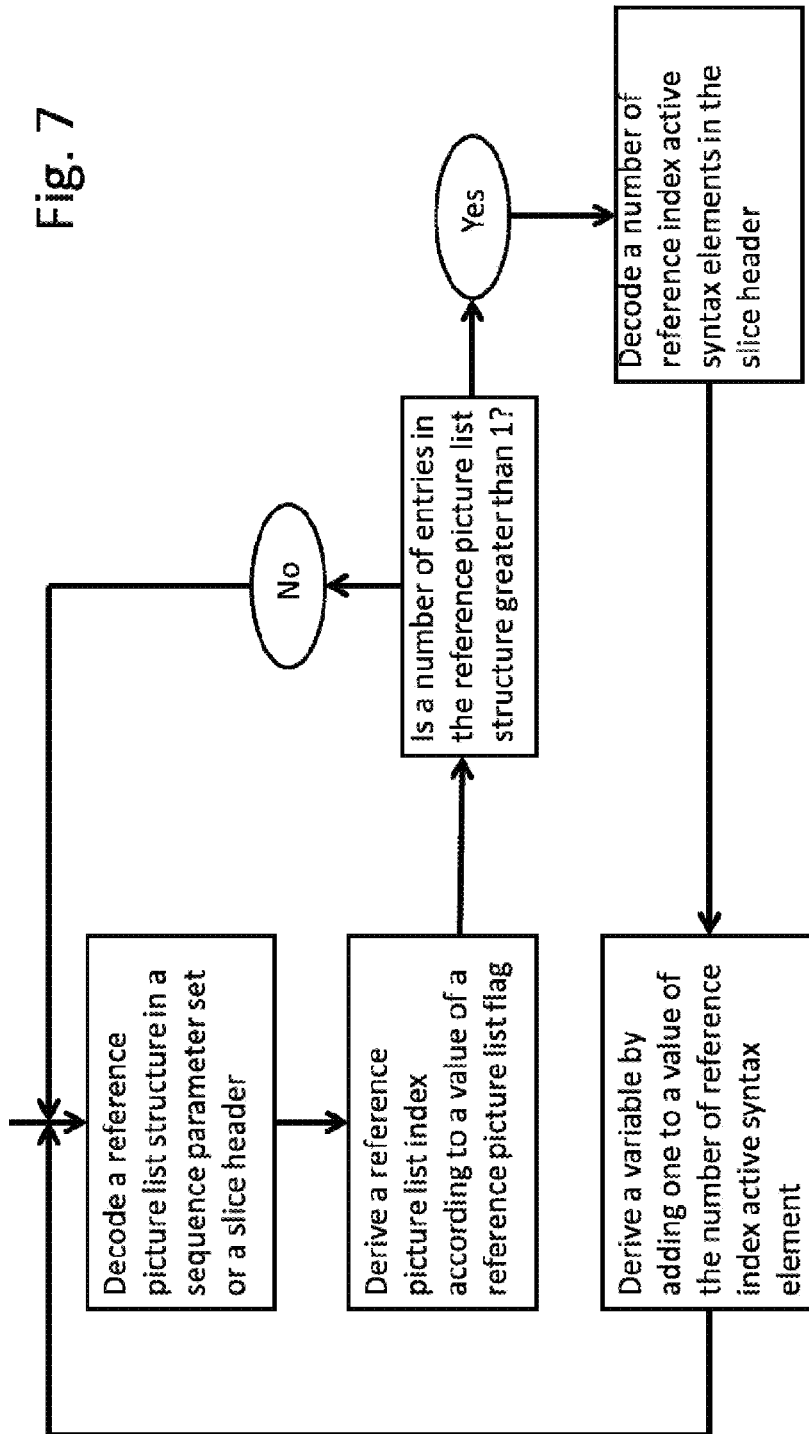
FIG. 7 is a flow chart illustrating an example of a method for determining reference picture list information for a reference picture list according to one or more techniques of this disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-14. Video decoder 600 may derive reference picture lists based on or according to the processes described above. Video decoder 600 may constructing the reference picture lists RefPicList0 and RefPicList1 based on or according to the processes described above. Video decoder may perform video decoding based on the reference picture lists.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse one or more syntax elements included in a parameter set, the syntax elements indicating one or more candidate reference picture lists, parse an index from a header associated with a region of a picture, the index indicating one of the candidate reference picture lists, and generate video data based on the indicated candidate reference picture list.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Application No. 62/734,995 on Sep. 21, 2018, No. 62/735,093 on Sep. 22, 2018, No. 62/737,049 on Sep. 26, 2018, No. 62/739,263 on Sep. 30, 2018, the entire contents of which are hereby incorporated by reference.

The invention claimed is:

1. A device comprising one or more processors configured to:
   decode a first syntax element in a sequence parameter set, wherein the first syntax element is a one bit flag and the first syntax element equal to a first value specifies that long term reference pictures might be used for inter prediction;
   decode a reference picture list structure in the sequence parameter set;
   decode a second syntax element in the reference picture list structure based on a value of the first syntax element, wherein the second syntax element is a one bit flag and the second syntax element specifies whether picture order count least significant bits of long term reference picture entries are present in the reference picture list structure;
   decode a third syntax element in the reference picture list structure, wherein the third syntax element specifies a number of entries in the reference picture list structure; and
   for each i-th entry in the reference picture list structure specified by a value of the third syntax element, decode a fourth syntax element in the reference picture list structure based on a value of the second syntax element, wherein the fourth syntax element specifies a value of a picture order count modulo of a picture referred to by an i-th entry in the reference picture list structure.

2. A device comprising one or more processors configured to:
   encode a first syntax element in a sequence parameter set, wherein the first syntax element is a one bit flag and the first syntax element equal to a first value specifies that long term reference pictures might be used for inter prediction;
   encode a reference picture list structure in the sequence parameter set;
   encode a second syntax element in the reference picture list structure based on a value of the first syntax element, wherein the second syntax element is a one bit flag and the second syntax element specifies whether picture order count least significant bits of long term reference picture entries are present in the reference picture list structure;
   encode a third syntax element in the reference picture list structure, wherein the third syntax element specifies a number of entries in the reference picture list structure; and
   for each i-th entry in the reference picture list structure specified by a value of the third syntax element, encode a fourth syntax element in the reference picture list structure based on a value of the second syntax element, wherein the fourth syntax element specifies a value of a picture order count modulo of a picture referred to by an i-th entry in the reference picture list structure.

3. A method for determining reference picture list information for a reference picture list, the method comprising:
- decoding a first syntax element in a sequence parameter set, wherein the first syntax element is a one bit flag and the first syntax element equal to a first value specifies that long term reference pictures might be used for inter prediction;
- decoding a reference picture list structure in the sequence parameter set;
- decoding a second syntax element in the reference picture list structure based on a value of the first syntax element, wherein the second syntax element is a one bit flag and the second syntax element specifies whether picture order count least significant bits of long term reference picture entries are present in the reference picture list structure;
- decoding a third syntax element in the reference picture list structure, wherein the third syntax element specifies a number of entries in the reference picture list structure; and
- for each i-th entry in the reference picture list structure specified by a value of the third syntax element, decoding a fourth syntax element in the reference picture list structure based on a value of the second syntax element, wherein the fourth syntax element specifies a value of a picture order count modulo of a picture referred to by an i-th entry in the reference picture list structure.

* * * * *